US011964356B2

(12) United States Patent
Otani et al.

(10) Patent No.: US 11,964,356 B2
(45) Date of Patent: Apr. 23, 2024

(54) HAND-HELD TOOL

(71) Applicant: MAKITA CORPORATION, Anjo (JP)

(72) Inventors: Ryosuke Otani, Anjo (JP); Junya Ishikawa, Anjo (JP); Takafumi Kotsuji, Anjo (JP); Satoshi Ninagawa, Anjo (JP); Ken Goto, Anjo (JP); Yu Eto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 890 days.

(21) Appl. No.: 16/981,247

(22) PCT Filed: Mar. 27, 2019

(86) PCT No.: PCT/JP2019/013155
§ 371 (c)(1),
(2) Date: Sep. 15, 2020

(87) PCT Pub. No.: WO2019/194036
PCT Pub. Date: Oct. 10, 2019

(65) Prior Publication Data

US 2021/0053175 A1 Feb. 25, 2021

(30) Foreign Application Priority Data

Apr. 5, 2018 (JP) ................................ 2018-072988
Apr. 5, 2018 (JP) ................................ 2018-072989
Apr. 5, 2018 (JP) ................................ 2018-072991

(51) Int. Cl.
*B25F 5/02* (2006.01)
*B24B 23/02* (2006.01)

(52) U.S. Cl.
CPC ................ *B24B 23/02* (2013.01); *B25F 5/02* (2013.01)

(58) Field of Classification Search
CPC ... B25F 5/00; B25F 5/02; B24B 55/00; B24B 23/02; F16P 3/00; F16P 3/008; F16P 3/20;
(Continued)

(56) References Cited

U.S. PATENT DOCUMENTS 3,564,186 A * 2/1971 Mittelstadt ............. H01H 21/10 200/538
4,063,600 A * 12/1977 Krzes ...................... B23B 45/02 310/68 B
(Continued)

FOREIGN PATENT DOCUMENTS

DE 10 2013 020 725 A1 6/2015
EP 2 881 228 B1 3/2017
(Continued)

OTHER PUBLICATIONS

Mar. 29, 2022 Office Action issued in Japanese Patent Application No. 2018-072988.
(Continued)

*Primary Examiner* — Joshua G Kotis
(74) *Attorney, Agent, or Firm* — Oliff PLC

(57) ABSTRACT

A hand-held tool, such as a disc grinder, is used to perform work at a high work site, a countermeasure is taken to prevent the hand-held tool from falling by using a suspension tool, such as a tether strap. If a coupling part that couples the suspension tool to the hand-held tool is damaged, this fact is notified to a user. Thereby, an original function of the suspension tool can be reliably performed. If a large impact is applied to a coupling member via a suspension tool, the coupling member is displaced to a second position, due to the deformation of a first position retaining member. A conductive portion disengages from
(Continued)

contacts to cause a power circuit to be shut off, thereby prohibiting a main body part from being activated.

9 Claims, 21 Drawing Sheets

(58) Field of Classification Search
CPC .. H01H 3/20; H01H 3/022–0226; H01H 9/06; H01H 2225/008; H01H 2300/026
See application file for complete search history.

(56) References Cited

U.S. PATENT DOCUMENTS

| | | | | |
|---|---|---|---|---|
| 4,619,355 | A * | 10/1986 | Adrian | B66B 29/04 198/323 |
| 4,895,336 | A * | 1/1990 | Lieberman | B27B 9/00 30/388 |
| 5,850,698 | A * | 12/1998 | Hurn | B27B 9/00 30/377 |
| 6,686,548 | B2 * | 2/2004 | Chen | H01H 9/06 200/332.2 |
| 6,951,231 | B2 * | 10/2005 | Garcia | B27C 1/14 144/129 |
| 7,125,277 | B2 * | 10/2006 | Wascow | B25F 5/00 439/373 |
| 8,986,165 | B2 * | 3/2015 | Ashby | A63B 24/0087 482/901 |
| 9,457,461 | B2 * | 10/2016 | Francis | B23Q 13/00 |
| 10,045,606 | B2 * | 8/2018 | Cirincione, II | B25F 5/02 |
| 10,354,823 | B2 * | 7/2019 | Nagy | H01H 51/27 |
| 10,490,370 | B2 * | 11/2019 | Kim | H01H 89/00 |
| 2006/0070761 | A1 * | 4/2006 | Vahabi-Nejad | B25C 7/00 173/171 |
| 2010/0200378 | A1 * | 8/2010 | Wang | H01H 1/365 200/284 |
| 2011/0073340 | A1 | 3/2011 | Matsumoto et al. | |
| 2011/0162219 | A1 * | 7/2011 | Okouchi | B27B 17/00 173/217 |
| 2011/0289786 | A1 * | 12/2011 | Bijsterveldt | B25F 5/02 30/514 |
| 2012/0031635 | A1 * | 2/2012 | Svennung | B27B 17/08 30/381 |
| 2012/0085560 | A1 | 4/2012 | Kuroyanagi et al. | |
| 2015/0040408 | A1 | 2/2015 | Francis et al. | |
| 2015/0266201 | A1 | 9/2015 | Nakashima | |
| 2015/0343617 | A1 | 12/2015 | Kondo et al. | |
| 2016/0144530 | A1 * | 5/2016 | Weinig | B23D 57/023 439/180 |
| 2017/0021490 | A1 * | 1/2017 | Francis | A61K 47/58 |
| 2017/0221657 | A1 | 8/2017 | Barker | |

FOREIGN PATENT DOCUMENTS

| | | | |
|---|---|---|---|
| JP | 2006-326753 | A | 12/2006 |
| JP | 2011-67909 | A | 4/2011 |
| JP | 2012-81532 | A | 4/2012 |
| JP | 2015-178154 | A | 10/2015 |
| JP | 2015-223657 | A | 12/2015 |
| JP | 2017-189824 | A | 10/2017 |
| JP | 2017-536066 | A | 11/2017 |

OTHER PUBLICATIONS

Mar. 29, 2022 Office Action issued in Japanese Patent Application No. 2018-072991.
Jul. 2, 2019 International Search Report issued in International Patent Application No. PCT/JP2019/013155.

* cited by examiner

HAND-HELD TOOL

CROSS-REFERENCE TO RELATED APPLICATIONS

The present application is a U.S. National Phase entry of, and claims priority to, PCT Application No. PCT/JP2019/013155, filed Mar. 27, 2019, which claims priority to Japanese Patent Application No. 2018-072988, filed Apr. 5, 2018, Japanese Patent Application No. 2018-072989, filed Apr. 5, 2018, and Japanese Patent Application No. 2018-072991, filed Apr. 5, 2018, which are incorporated herein by reference in their entireties for all purposes.

BACKGROUND

The present disclosure relates to a hand-held tool, for example a disc grinder, which is held by a user's hand when operated.

In using a hand-held tool, for example such as a disk grinder used for a grinding work, a countermeasure may be taken to prevent the hand-held tool from falling by connecting the hand-held tool to a scaffolding or handrail using a suspension tool, such as a tether strap. This countermeasure is taken especially when the work is performed at a high work site.

Japanese Laid-Open Patent Publication No. 2006-326753 and Japanese Laid-Open Patent No. 2015-178154 disclose techniques relating to a hook for coupling a suspension tool of this kind to the hand-held tool, or for suspending the hand-held tool from a work belt, a scaffold, or the like when a work is not being performed.

SUMMARY

With this type of hand-held tool, a coupling part that couples the suspension tool, such as the fall-prevention tether strap, to the hand-held tool may be damaged when a large impact is applied to the hand-held tool via the suspension tool. As a result, the suspension function may not work properly. However, sufficient countermeasures have not been fully taken to prevent the user from continuing to use such a suspension tool without knowing the fact that it may not work properly.

An object of the present disclosure is to notify the user that the coupling part that couples the fall prevention suspension tool to the hand-held tool has been damaged, thereby allowing an original function of the suspension tool to be reliably performed.

The problems described above can be solved using the following aspects. A first aspect relates to a hand-held tool that is held by a user's hand when operated. The hand-held tool according to the first aspect includes a coupling part that couples a suspension tool. According to the first aspect, the coupling part includes a coupling member that is displaceably supported relative to a housing of the hand-held tool between a first position and a second position. The coupling part also includes a first position retaining member that holds the coupling member at the first position. The first aspect is configured such that the coupling member is displaced to the second position due to deformation of the first position retaining member, thereby prohibiting a main body of the hand-held tool from being activated.

According to the first aspect, the suspension tool, such as a tether strap, is coupled to the coupling member held at the first position by the first position retaining member. If an impact is applied to the coupling member via the suspension tool, the coupling member may be displaced from the first position to the second position, due to deformation of the first position retaining member. The displacement of the coupling member to the second position visually informs the user that the coupling part has been damaged. Additionally, the displacement of the coupling member to the second position prohibits the main body from being activated. Because of this configuration, the user can recognize that it is necessary to perform a maintenance work, for example, such as replacing the first position retaining member or the coupling member with a new one. As a result, the suspending function of the suspension tool (and the function of the coupling part) can be reliably performed.

A second aspect, which relates to the hand-held tool according to the first aspect, has a shut off of a power circuit causing the main body of the hand-held tool to be prohibited from activation.

According to the second aspect, when the coupling member is displaced to the second position, the power circuit is shut off, thereby prohibiting the activation of the main body.

A third aspect, which relates to the hand-held tool according to the second aspect, has the coupling member including a conductive portion, a frame member supporting the coupling member, and the frame member including a contact. The power circuit of this aspect includes a circuit conductive part that provides electric conductivity between the conductive portion and the contact. Furthermore, the electrical circuit is in a power supply state when the circuit conductive part has the conductive portion and the contact contacting each other at the first position, providing electric conductance therebetween. The electrical circuit is shut off when the conductive portion disengages from the contact at the second position, thereby causing the circuit conductive part to be in an electrically nonconductive state.

According to the third aspect, if an impact is applied to the coupling member via the suspension tool, the coupling member may be displaced to the second position. This may cause the conductive portion to disengage from the contact, thereby causing the power circuit to be shut off. Because of the fact that the power circuit is shut off and activation of the main body is prohibited, the user is further notified that the coupling part has been damaged.

A fourth aspect, which relates to the hand-held tool according to the third aspect, has the conductive portion being held in an electrically contacting state with the contact, owing to the elasticity of the contact that elastically interposes the conductive portion. The conductive portion may be displaced to be separated from the contact against an elastic force of the contact.

According to the fourth aspect, in the state where the coupling member is located at the first position, the conductive portion and the contact are held in the electrically contacting state owing to a pinching force caused by the elasticity of the contact. When the coupling member is displaced to the second position, the contact portion is displaced against the elastic pinching force of the contact, in a direction in which the contact is electrically open. The conductive portion then disengages from the contact, thereby shutting off the power circuit.

A fifth aspect, which relates to the hand-held tool according to any one of the first to fourth aspects, includes that when the coupling member is displaced to the second position, a switch lever is prohibited from an ON operation, thereby causing the main body to be prohibited from activation.

According to the fifth aspect, if an impact is applied to the coupling member via the suspension tool, the coupling member is displaced to the second position. Because of this, the conductive portion disengages from the contact, thereby shutting off the power circuit. As a result, because of the fact that the power circuit is shut off and activation of the main body part is prohibited, damage to the coupling part is notified to the user.

A sixth aspect, which relates to the hand-held tool according to any one of the first to fifth aspects, has the coupling member being prohibited from returning to the first position after the coupling member has been displaced to the second position.

According to the sixth aspect, the state in which the coupling member is displaced to the second position can be more reliably and visually recognized. Thus, the damage to the coupling part is more reliably notified to the user.

BRIEF DESCRIPTION OF THE DRAWINGS

FIG. 7 is a longitudinal sectional view of the coupling part according to the second embodiment. This figure shows a state where the coupling member is located at the first position and a switch is turned on.

DETAILED DESCRIPTION

Figure 1:
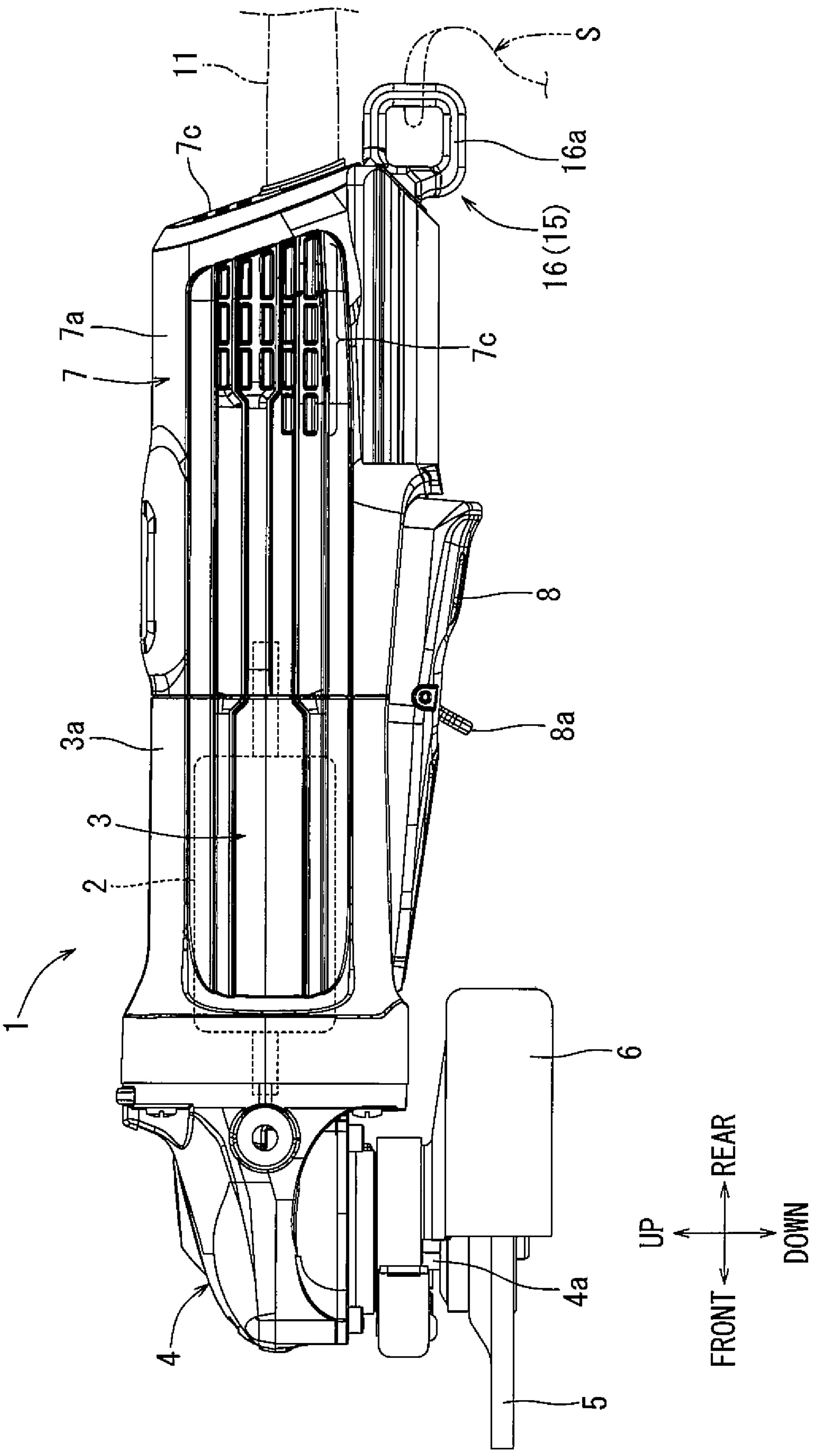
FIG. 1 is an overall side view of a hand-held tool provided with a coupling part according to a first embodiment. This figure shows a state where a coupling member is located at a first position.

Next, embodiments according to the present invention will be explained with reference to FIGS. 1 to 28. FIGS. 1 to 5 show a hand-held tool 1 according to a first embodiment. In the first embodiment, a disc grinder is illustrated as the hand-held tool 1. The hand-held tool 1 includes a main body part 3 having a tubular main body housing 3*a* in which an electric motor 2 is installed as a drive source. A main body housing 3*a* has a size configured to be easily held by a user in one of his or her hand and to function as a grip.

A large switch lever 8 is provided on a lower surface of the main body part 3 so as to be tilted in an up-to-down direction. When the switch lever 8 is pulled upward with a fingertip of the user's hand holding the main body 3, the electric motor 2 is activated. The switch lever 8 is provided with a small lock-off lever 8*a*. As illustrated, when the lock-off lever 8*a* is raised, the switch lever 8 cannot be pulled upward, and accordingly the electric motor 2 remains in a stopped state (lock-off state). The lock-off lever 8*a* may be tilted rearward to release the lock-off state, so that the switch lever 8 can be pulled upward.

A gear head 4 is connected to a front side of the main body part 3. The gear head 4 includes a gear train (not shown in the figures) for decelerating an output of the electric motor 2 to be output to a spindle 4*a*. The spindle 4*a* is orthogonal to a motor axis of the electric motor 2. The spindle 4*a* protrudes downward from the lower surface of the gear head 4. A circular grindstone 5 is attached to a lower portion of the spindle 4*a*. A rear side of the grindstone 5 is covered with a cover 6.

Figure 2:
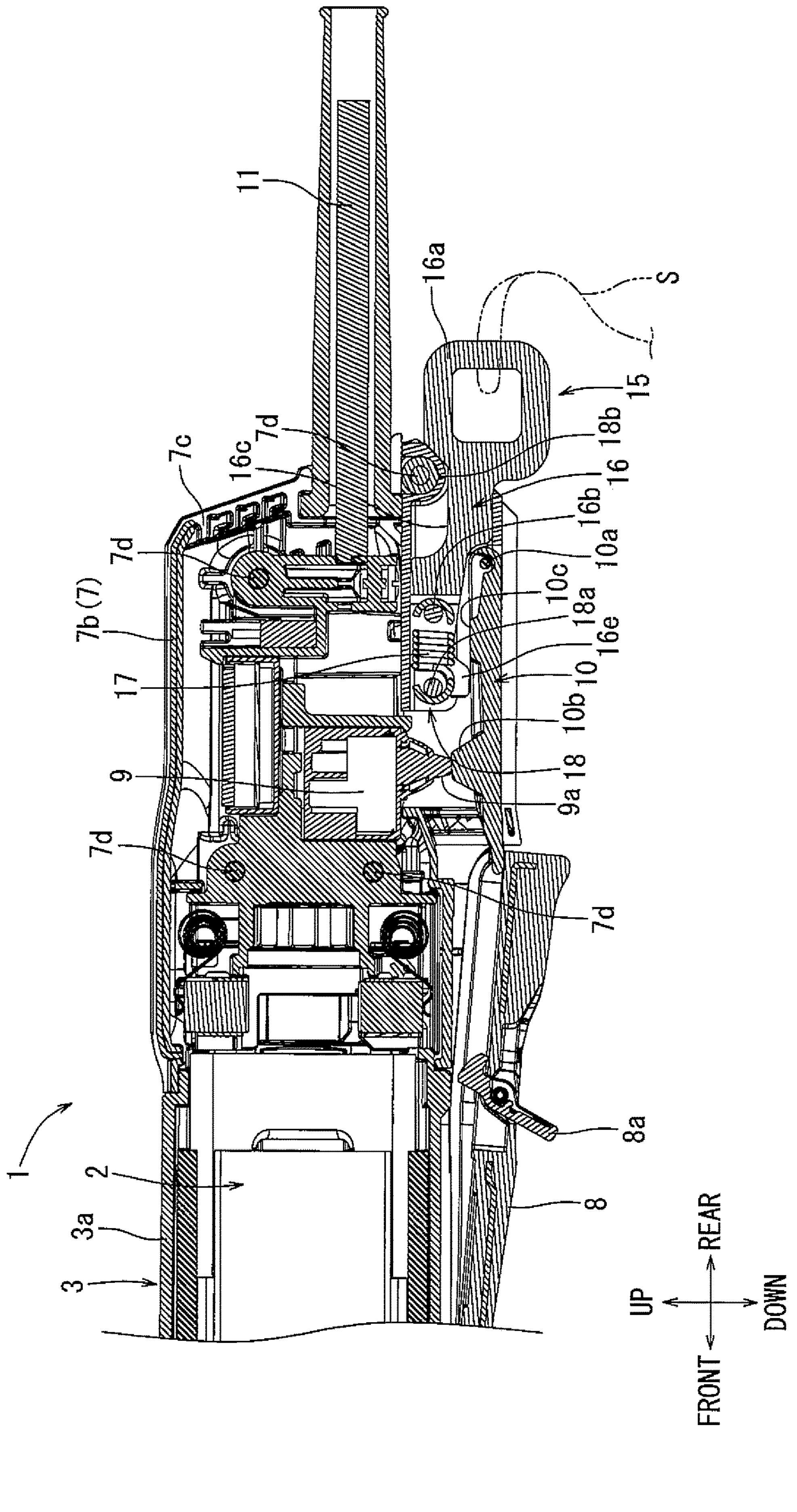
FIG. 2 is a longitudinal sectional view of the coupling part according to the first embodiment. This figure shows a state where the coupling member is located at the first position.
Figure 3:
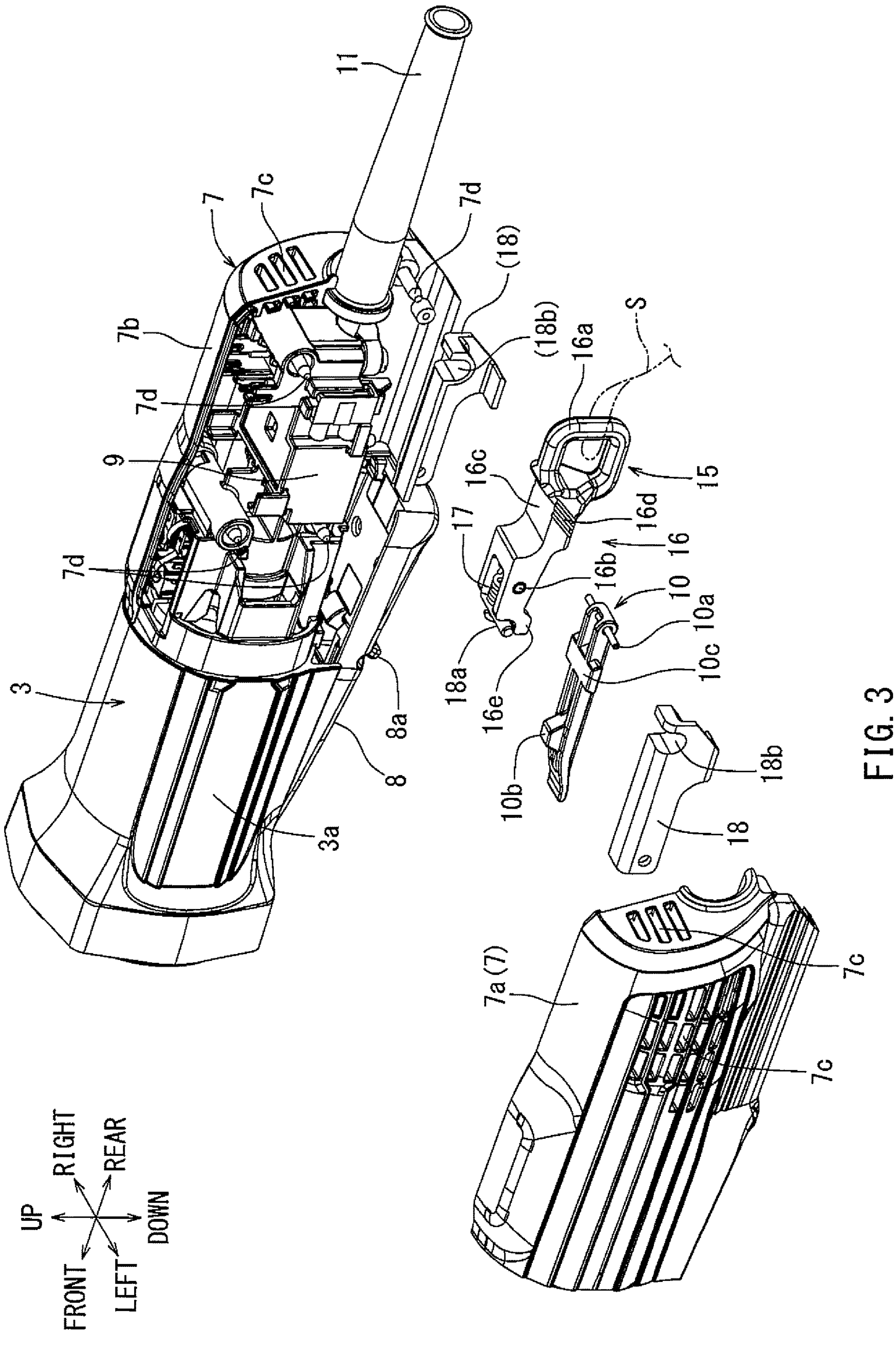
FIG. 3 is an exploded perspective view of the coupling part according to the first embodiment.

A rear part of the main body 3 is covered with a rear case 7 having a left and right half-split structure. FIG. 3 shows a state in which a left half-split case 7*a* is removed. The left half-split case 7*a* and a right half-split case 7*b* are fastened with screws to each other at four screw fastening parts 7*d* in total. As shown in FIG. 2 and FIG. 3, the main switch 9 is provided inside the rear case that is formed by mating the left half-split case 7*a* with the right half-split case 7*b*. A switch arm 10 is provided at a lower portion of the rear case 7, so as to be tilted in an up-to-down direction via a support shaft 10*a*. A front end portion of the switch arm 10 is engaged with the rear portion of the switch lever 8. Because of this configuration, the switch arm 10 is tilted in the up-to-down direction in conjunction with a vertical movement of the switch lever 8. When the switch lever 8 is pulled upward, the rear part thereof is displaced upward and the switch arm 10 is tilted upward (clockwise direction in FIG. 2). An operation protrusion 10*b* is provided on an upper surface of the switch arm 10. The operation protrusion 10*b* is arranged so as to face an operation button 9*a* of a main switch 9. Because of this configuration, when the switch arm 10 is tilted upward, the operation button 9*a* is pushed upward by the operation protrusion 10*b*, so as to cause the main switch 9 to be turned on.

A large number of intake ports 7*c* for introducing outside air are provided on the rear surface and left and right side surfaces of the rear case 7. Although not shown in the figures, a cooling fan is attached to the output shaft of the electric motor 2. When the electric motor 2 is activated, the cooling fan rotates, which causes outside air to be introduced into the rear case 7, as well as the main body housing 3*a*, through the intake port 7*c*. The introduced outside air (motor cooling air) mainly cools the electric motor 2. The motor cooling air is discharged to the outside from the vicinity of a connecting part between the main body part 3 and the gear head 4.

In this embodiment, the exemplified hand-held tool 1 is driven by AC power. A power supply cord 11 projects from the rear surface of the rear case 7. AC power is supplied via the power cord 11.

The hand-held tool 1 according to a first embodiment includes a coupling part 15 for coupling a suspension tool S, such as a tether strap, to the hand-held tool 1 for preventing the hand-held tool 1 from falling during work. The coupling part 15 according to the first embodiment includes a coupling member 16 and a tension spring 17. The coupling member 16 is provided on the rear case 7, so as to be displaceable between a first position and a second position. In this embodiment, the tension spring 17 has a function of a first position retaining member for holding the coupling member 16 at the first position.

As shown in FIGS. 2 and 3, an inverted U-shaped frame body 18 is attached to a rear lower surface of the rear case 7 and above the switch arm 10. The frame body 18 is interposed between the left half-split case 7*a* and the right half-split case 7*b*, and is assembled so as not to be displaced. As shown in the figures, the frame body 18 also has the left and right half-split structure. The coupling member 16 is supported by the frame body 18 so as to be slidable forward and backward.

The coupling member 16 is provided with a ring-shaped hooking part 16*a* at the rear part thereof. The hooking part 16*a* protrudes rearward of the frame body 18, and thus protrudes further rearward than and from the rear surface of the rear case 7. A suspension tool S, such as a tether strap, can be coupled to the hooking portion 16*a*.

A tension spring 17 is interposed between the frame body 18 and the coupling member 16. A front spring pin 18*a* is provided on the front part of the frame body 18. The coupling member 16 is provided with a rear spring pin 16*b*. The front side of the tension spring 17 is hooked on the front spring pin 18*a*, and the rear side of the tension spring 17 is hooked on the rear spring pin 16*b*. The coupling member 16 is held at the first position, shown in FIG. 2, by the tension spring 17. As shown in FIG. 2, the first position is a displaceable front end position of the coupling member 16, and is generally regarded, for example, as a position where the hooking portion 16*a* contacts the rear portion of the frame body 18 and cannot be further displaced forward. A semicircular recess part 18*b* is provided at the rear part of the frame 18 and has a structure that avoids the screw fastening part 7*d*. The hooking part 16*a* contacting the recess part 18*b* defines a front end position of the coupling member 16.

A relief recess 16*c* is provided on the upper portion of the coupling member 16 and has a structure that avoids the recess part 18*b* of the frame body 18. The relief recess 16*c* is formed long in the front-to-rear direction and has a width that allows the recess part 18*b* of the frame body 18 to be inserted thereinto. The coupling member 16 can be displaced back and forth relative to the rear case 7, within a range in which the recess part 18*b* can be relatively displaced within the relief recess 16*c*. The front end position of the displaceable range of the coupling member 16, in the front-rear direction, is set as the first position, and the rear end position is set as the second position.

If an impact is applied to the coupling member 16 via the suspension tool S, for example, when the hand-held tool 1 happens to fall, the connecting member 16 may be displaced rearward against the biasing force of the tension spring 17. When the impact is weak, the coupling member 16 is displaced within the elastic region of the tension spring 17. Thus, when the impact force is removed, the coupling member 16 is returned to the first position, due to the biasing force of the tension spring 17. In the first embodiment, the tension spring 17 corresponds to the first position retaining member.

Figure 4:
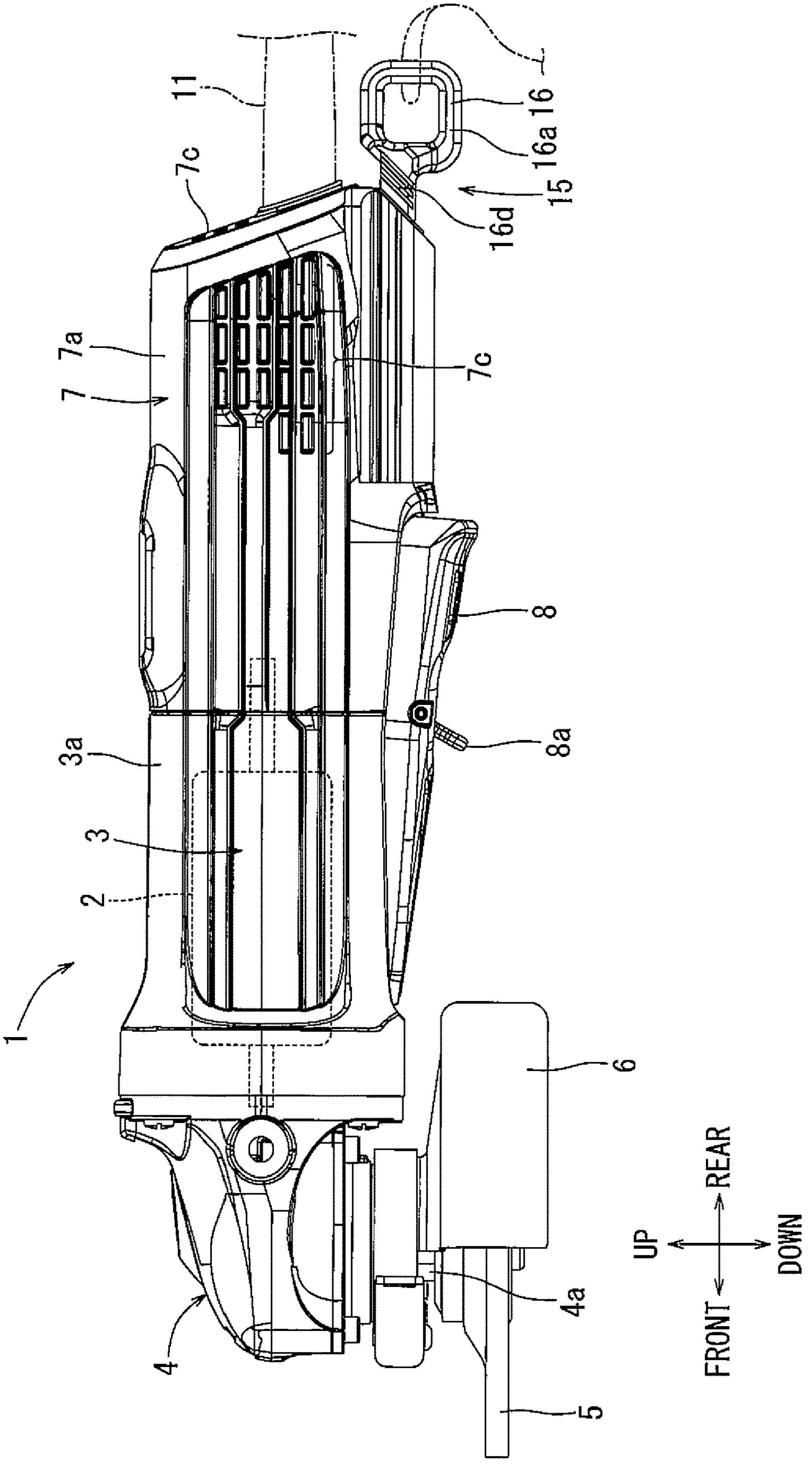
FIG. 4 is an overall side view of the hand-held tool according to the first embodiment. This figure shows a state where the coupling member is located at a second position.
Figure 5:
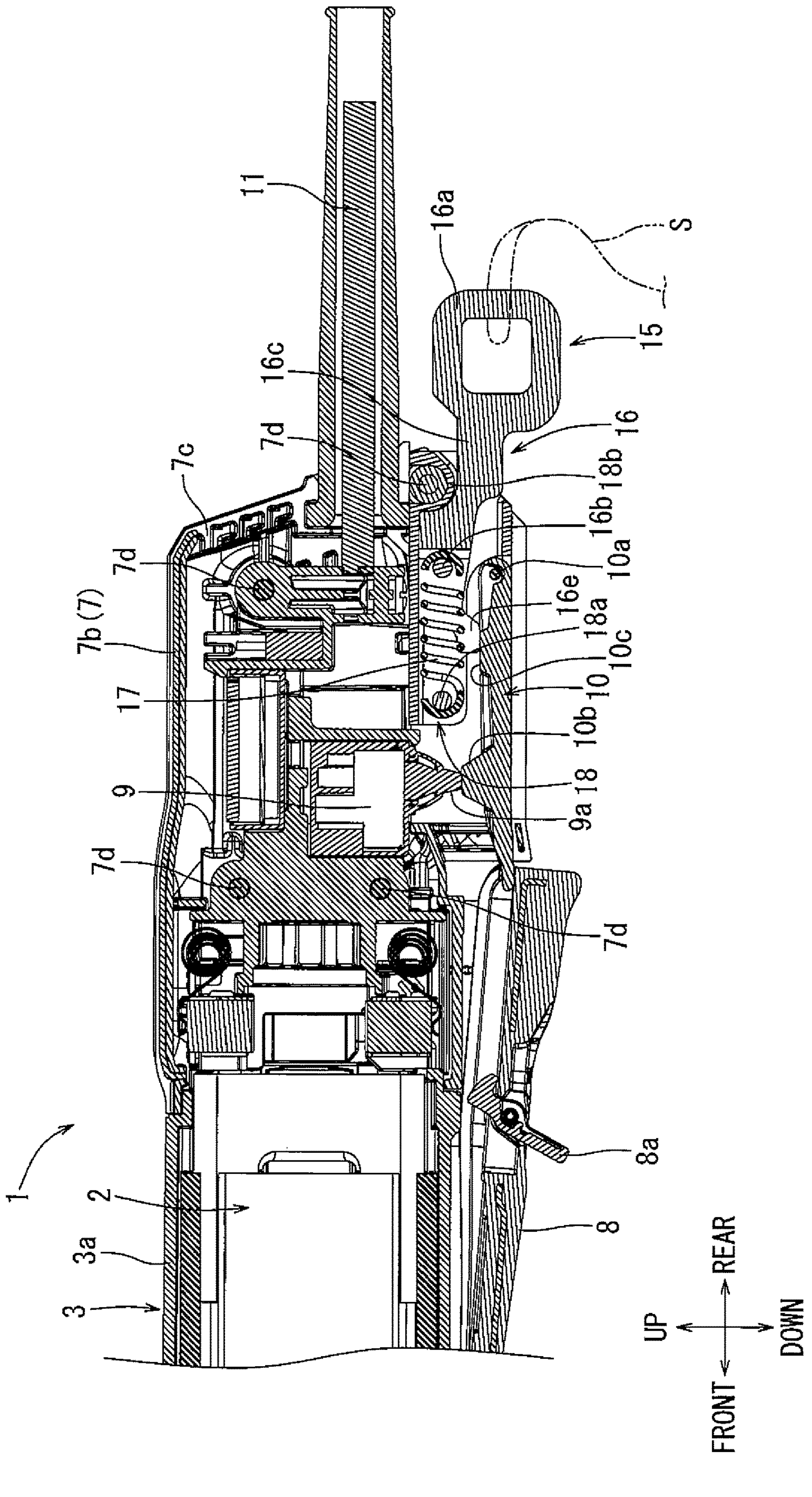
FIG. 5 is a longitudinal sectional view of the coupling part according to the first embodiment. This figure shows a state where the coupling member is located at the second position.

If the impact applied to the coupling member 16 via the suspension tool S is large, the tension spring 17 may be plastically deformed beyond its elastic region. As a result, the coupling member 16 is displaced to the second position. FIG. 4 and FIG. 5 show a state where the coupling member 16 is displaced to the second position. The second position corresponds to a retracted end position, where the recess part 18*b* of the frame body 18 is contacted by the front end of the relief recess 16*c* of the coupling member 16. In this position, further retraction of the coupling member 16 is difficult. As shown in FIG. 4, when the coupling member 16 is displaced to the second position, a notification indicator 16*d* provided on a side surface of the coupling member 16 can be visually confirmed. The user can recognize that the coupling member 16 has been displaced to the second position by visually confirming the indicator 16*d*.

If the coupling member 16 is displaced to the second position, the coupling member 16 is still held at the second position, even after the impact has been removed. This is because the tension spring 17 has been plastically deformed, beyond its original elastic region. As a result, the fact that the coupling part 15 has been damaged is reliably notified.

In the state where coupling material 16 has been displaced to the second position, the switch lever 8 cannot be pulled. On the lower surface of the coupling member 16, a restriction protrusion 16*e* is provided. Opposed to this, on the upper surface of the switch arm 10, there is a contact base 10*c*, which may be provided with a one-step structure. When the coupling member 16 is displaced to the second position, the restriction protrusion 16*e* is positioned over the contact base 10*c*. In this state, the displacement of the switch arm 10 to a position where the power is turned ON is restricted. This prevents the switch lever 8 from being pulled upward. Because of this configuration, when the coupling part 15 is damaged such that the coupling member 16 is displaced to the second position, the electric motor 2 cannot be activated, and thus the hand-held tool 1 becomes unusable.

According to the coupling part 15 of the first embodiment described above, the suspension tool S, such as a tether strap, is connected to the coupling member 16, which is held at the first position by the tension spring 17 serving as the first position retaining member. The state where the coupling member 16 is located at the first position is a normal state of the coupling part 15, and a sufficient suspending function of the suspension tool S is performed in this normal state.

When an impact is applied to the coupling member 16 via the suspension tool S, the tension spring 17 may be plastically deformed by the impact, causing the coupling member 16 to be displaced from the first position to the second position. The displacement of the coupling member 16 to the second position visually informs the user that the coupling part 15 has been damaged. If the coupling member 16 is displaced to the second position, the indicator 16*d* is exposed, and thus the position of the coupling member 16 is more reliably notified.

By visually notifying the user that the coupling part 15 has been damaged, the user can recognize that maintenance work, such as replacement of the coupling member 16 or the tension spring 17 serving as the first position retaining member, needs to be performed. As a result, the suspending function of the suspension tool S (the function of the coupling part 15) can be reliably exhibited.

Furthermore, the coupling member 16 may be displaced to the second position, due to the plastic deformation of the tension spring 17 serving as the first position retaining member. Since the tension spring 17 is plastically deformed due to being displaced to the second position, which is beyond its original elastic region, the coupling member 16 will be held at the second position, without being returned to the first position. Because of this configuration, according to the coupling part 15 of the first embodiment, the tension spring 17, which serves as the first position retaining member, also functions as a second position retaining member for holding the coupling member 16 at the second position. The tension spring 17, which also functions as the second position retaining member, restricts the coupling member 16 from being displaced to the first position and holds the coupling member 16 at the second position. As a result, the fact that the coupling part 15 has been damaged is more reliably notified to the user.

By performing a maintenance work, such as a replacement of the plastically deformed tension spring 17, the coupling member 16 can be returned to its normal state, in which it can be held at the first position again. As a result, the coupling part 15 can be used in the normal state again.

Furthermore, according to the coupling part 15 of the first embodiment, if the coupling member 16 is displaced to the second position by the impact received through the suspension tool S, the switch arm 10 is restricted from being displaced to the position where the power is turned ON. As a result, the switch lever 8 cannot be pulled, and activation of the electric motor 2 is restricted. Since the main body part 3 cannot be activated in this way, the fact that the coupling part 15 has been damaged is more reliably notified. Thus, the use of the hand-held tool 1 in the state where the coupling part 15 has been damaged is avoided.

Figure 6:
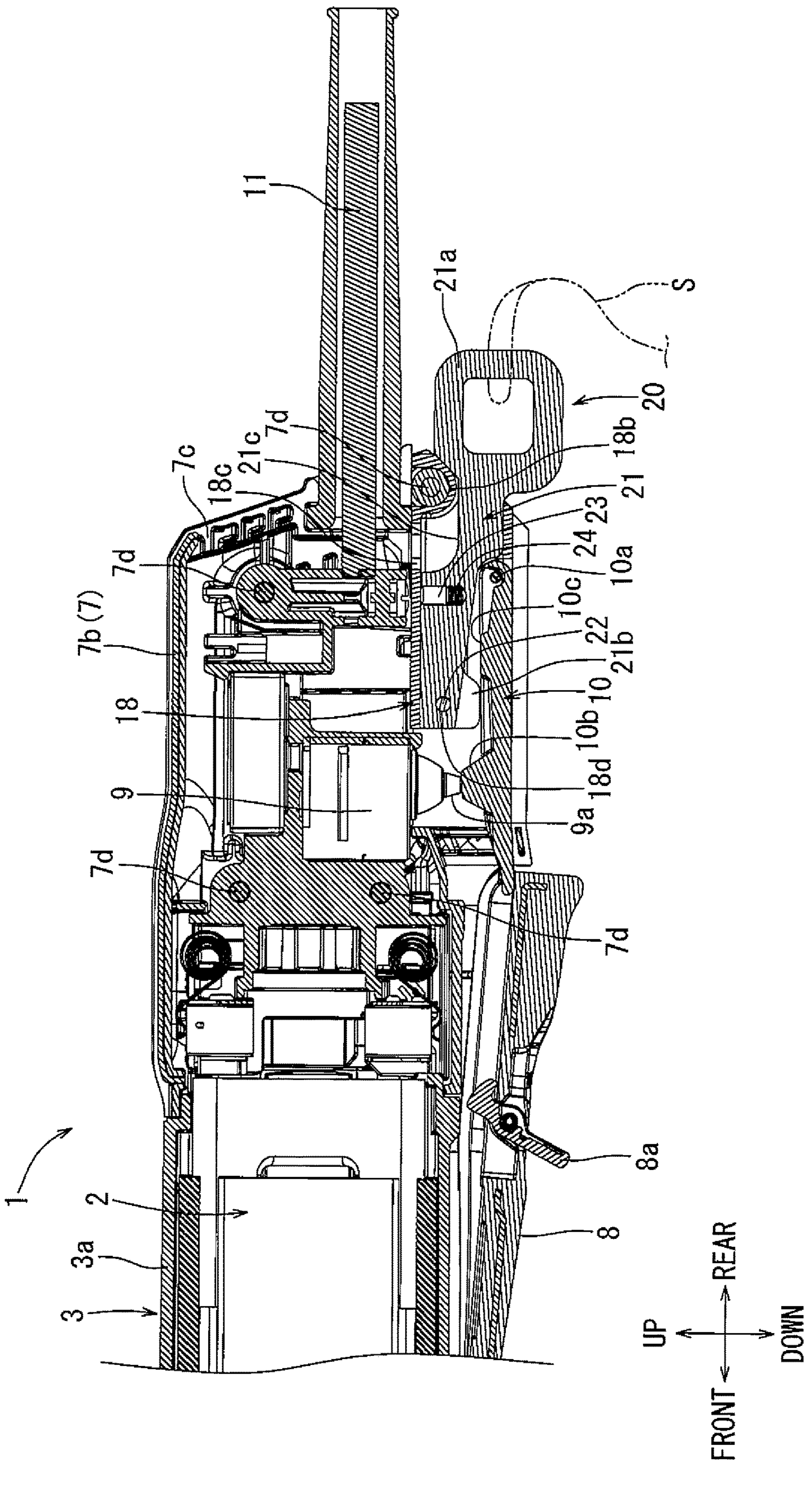
FIG. 6 is a longitudinal sectional view of the coupling part according to a second embodiment. This figure shows a state where a coupling member is located at the first position.
Figure 8:
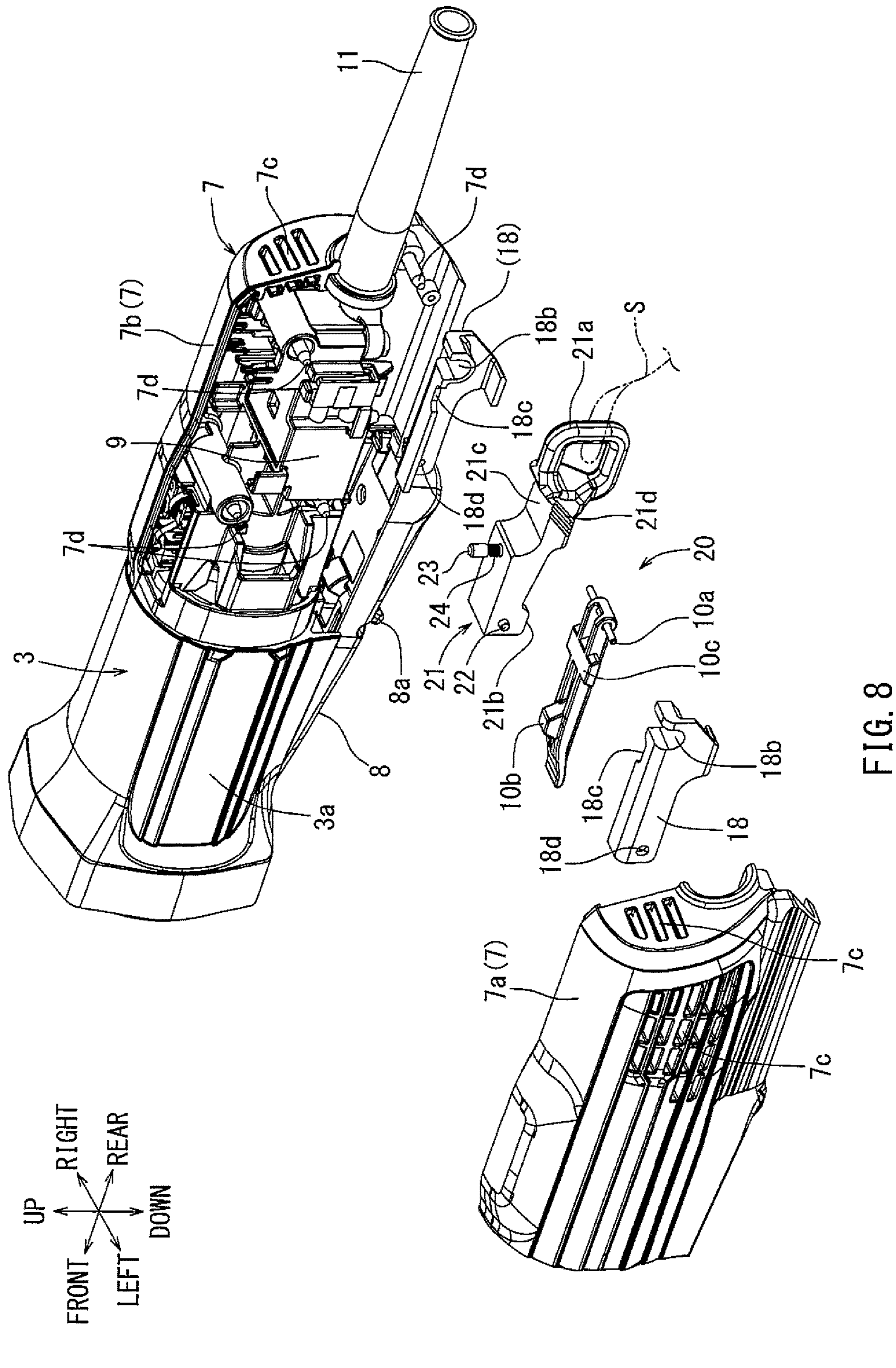
FIG. 8 is an exploded perspective view of the coupling part according to the second embodiment.

FIG. 6 and after show a coupling part 20 according to a second embodiment. As shown in FIG. 8, the coupling part 20 of the second embodiment differs from the coupling member 16 of the first embodiment at least in that the coupling part 20 is provided with a shaft member 22, instead of the tension spring 17, for use as the first position retaining member that holds a coupling member 21 at the first position. The second embodiment also differs from the first embodiment at least in that the coupling part 20 is provided with an engaging shaft 23 used as the second position retaining member that holds the coupling member 21 at the second position. Members and configurations that do not need to be substantially changed are denoted by the same reference numerals and the description thereof will be omitted.

The coupling member 21 according to the second embodiment is supported by an inverted U-shape frame body 18 assembled on the lower side of the rear case 7, so as to be slidable forward and backward. An annular hooking part 21*a* is provided on the rear portion of the coupling member 21. The hooking part 21*a* protrudes rearward from the rear surface of the rear case 7. The suspension tool S, such as a tether strap, is coupled to the hooking portion 21*a*.

Figure 7:
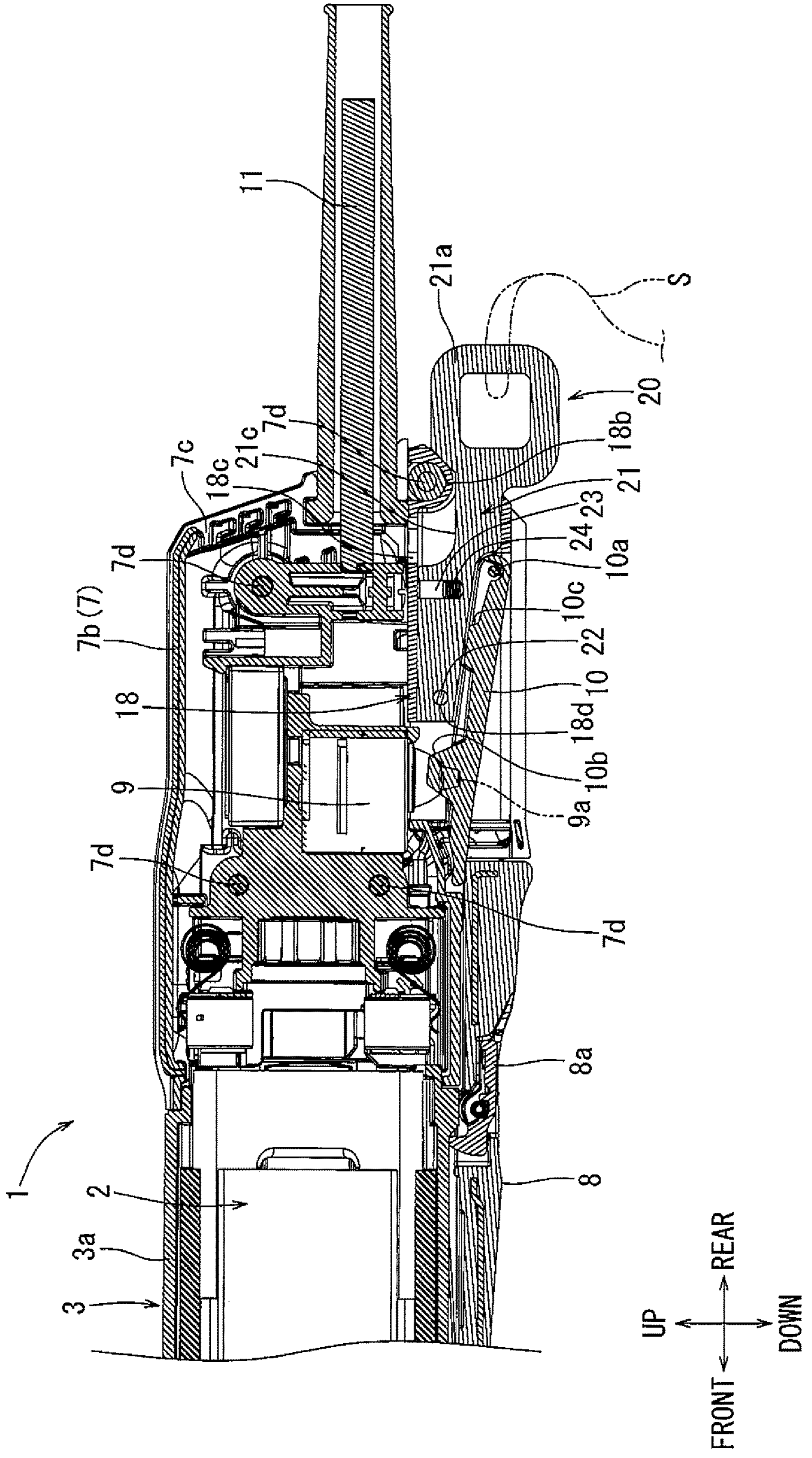
Figure 9:
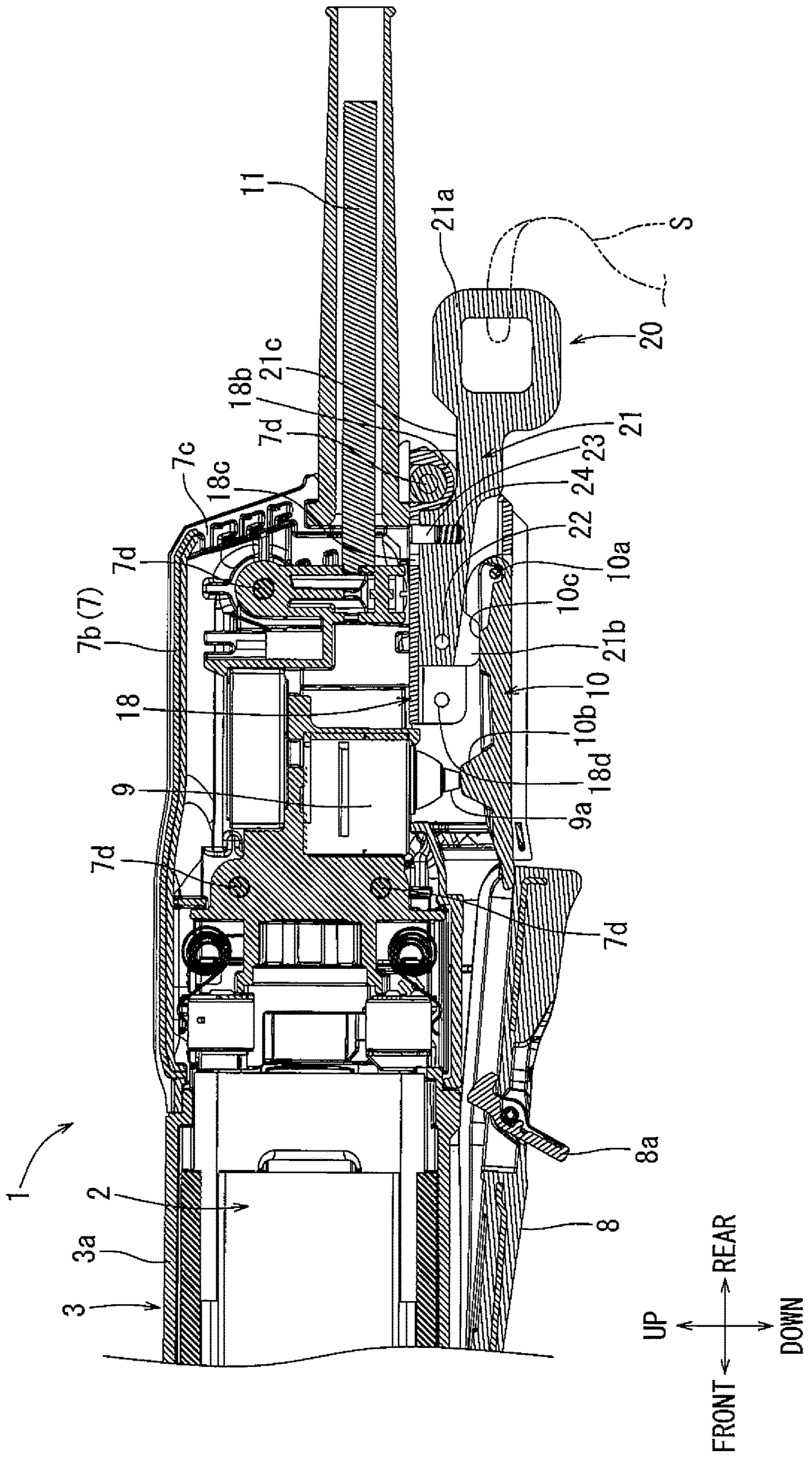
FIG. 9 is a longitudinal sectional view of the coupling part according to the second embodiment. This figure shows a state where the coupling member is located at a second position.

The coupling member 21 is coupled to the frame body 18 by the shaft member 22. As shown in FIGS. 6 and 7, the coupling member 21 is held at the first position, relative to the frame body 18, by the shaft member 22. As shown in FIG. 9, if the shaft member 22 is disengaged from the coupling member 21 or the frame body 18, the coupling member 21 is displaced rearward to the second position, relative to the frame body 18.

An engaging shaft 23 is supported on the upper surface of the coupling member 21, so as to be vertically displaceable. The engaging shaft 23 is biased by a compression spring 24, in a direction in which the engaging shaft 23 protrudes upward. As shown in FIGS. 6 and 7, in the state where the coupling member 21 is located at the first position, the engaging shaft 23 contacts the upper part of the frame body 18. Accordingly, the engaging shaft 23 is held at the retracted position, where it does not substantially protrude from the upper surface of the coupling member 21. An engaging hole 18*c* is provided in the upper portion of the frame body 18. As shown in FIG. 9, if the coupling member 21 is displaced to the second position, the engaging shaft 23 is displaced so as to be positioned below the engaging hole 18*c*. As a result, the engaging shaft 23 protrudes toward the engaging hole 18*c*, due to the compression spring 24. In the state where the engaging shaft 23 protrudes to the engaging hole 18*c*, the coupling member 21 is held at the second position, and is therefore restricted from returning to the first position.

Similar to the first embodiment, the coupling member 21 is provided with a restriction protrusion 21*b*, a relief recess 21*c*, and an indicator 21*d*. As shown in FIG. 9, if the coupling member 21 is displaced to the second position, the restriction protrusion 21*b* is positioned over the contact base 10*c* of the switch arm 10. Thus, the switch lever 8 cannot be pulled upward and the electric motor 2 cannot be activated.

The screw fastening part 7*b* as well as the recess part 18*b* of the frame body 18 structured to avoid the screw fastening part 7*d* are placed above the relief recess 21*c*. The coupling member 21 is displaceable in the front-to-rear direction, within a range in which the screw fastening part 7*d* and the recess part 18*b* are relatively displaceable within the relief recess 21*c*. As shown in FIGS. 6 and 7, when the coupling member 21 is located at the first position, the hooking part 21*a* is in contact with the recess part 18*b*.

A shaft member 22 is attached to the front part of the coupling member 21. The shaft member 22 protrudes laterally from both the left and right surfaces of the coupling member 21. Both ends of the shaft member 22 are inserted into the engaging holes 18*d* provided on the left and right surface of the front part of the frame body 18, respectively, so that the coupling member 21 is held at the first position. As shown in FIG. 7, in a normal state in which the coupling member 21 is held at the first position and the suspending function of the suspending tool S can be sufficiently performed, the main switch 9 can be turned on by pulling the switch lever 8. In this state, the hand-held tool 1 can be used.

As shown in FIG. 9, if a large impact is applied to the coupling member 21 via the suspending tool S, and as a result, the shaft member 22 is disengaged from the engaging hole 18*d* and the coupling member 21 is displaced to the second position, the indicator 21*d* is exposed. In this case, the user is reliably notified that the coupling member 21 has been displaced to the second position.

According to the coupling part 20 of the second embodiment described above, the suspending tool S, such as a tether strap, is connected to the coupling member 21 held at the first position by the shaft member 22, the shaft member 22 functioning as the first position retaining member. The state in which the coupling member 21 is located at the first position is the normal state of the coupling part 20, and the suspending tool S has a sufficient suspending function in this normal state.

If an impact is applied to the coupling member 21 via the suspension tool S, the shaft member 22 may be disengaged from the engaging hole 18*d* by the impact and the coupling member 21 may be displaced from the first position to the second position. The displacement of the coupling member 21 to the second position informs the user that the coupling part 20 has been damaged. The necessity of maintenance work for the coupling part 20 is notified to the user by notifying that the coupling part 20 has been damaged. As a result, the suspending function of the coupling part 20 can be sufficiently performed.

Furthermore, in the second embodiment, the coupling member 21 is held at the second position due to the engaging shaft 23 entering the engaging hole 18*c*, after the coupling member 21 has been displaced to the second position. Accordingly, the return of the coupling member 21 to the first position is prohibited. As a result, the fact that the connecting portion 20 has been damaged can be more reliably notified to the user.

Furthermore, in the second embodiment, if the coupling part 20 is damaged and the coupling member 21 has been displaced to the second position, the switch lever 8 cannot be turned on. In other words, the handheld tool 1 cannot be used. As a result, the fact that the coupling part 20 has been damaged is reliably notified and the necessity of maintenance work is notified to the user.

For the coupling part 20 of the second embodiment, by replacing, for example, the shaft member 22 or the frame body 18, the coupling member 21 can be returned to the normal state, in which the coupling member 21 is held at the first position again. In this way, by performing the necessary maintenance work, the coupling part 20 can be used again in the normal state.

Figure 10:
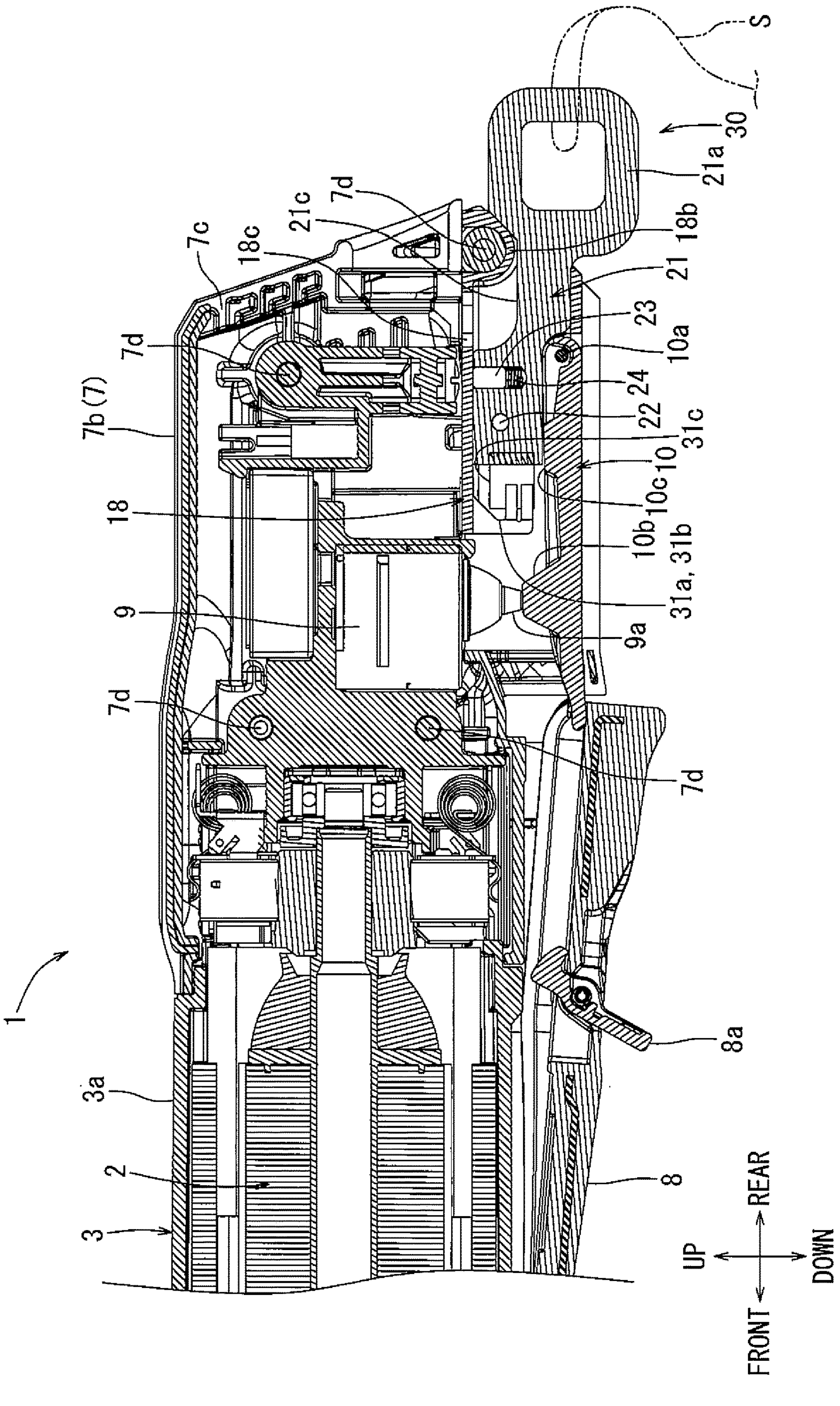
FIG. 10 is a longitudinal sectional view of the coupling part according to a third embodiment. This figure shows a state where a coupling member is located at a first position.
Figure 11:
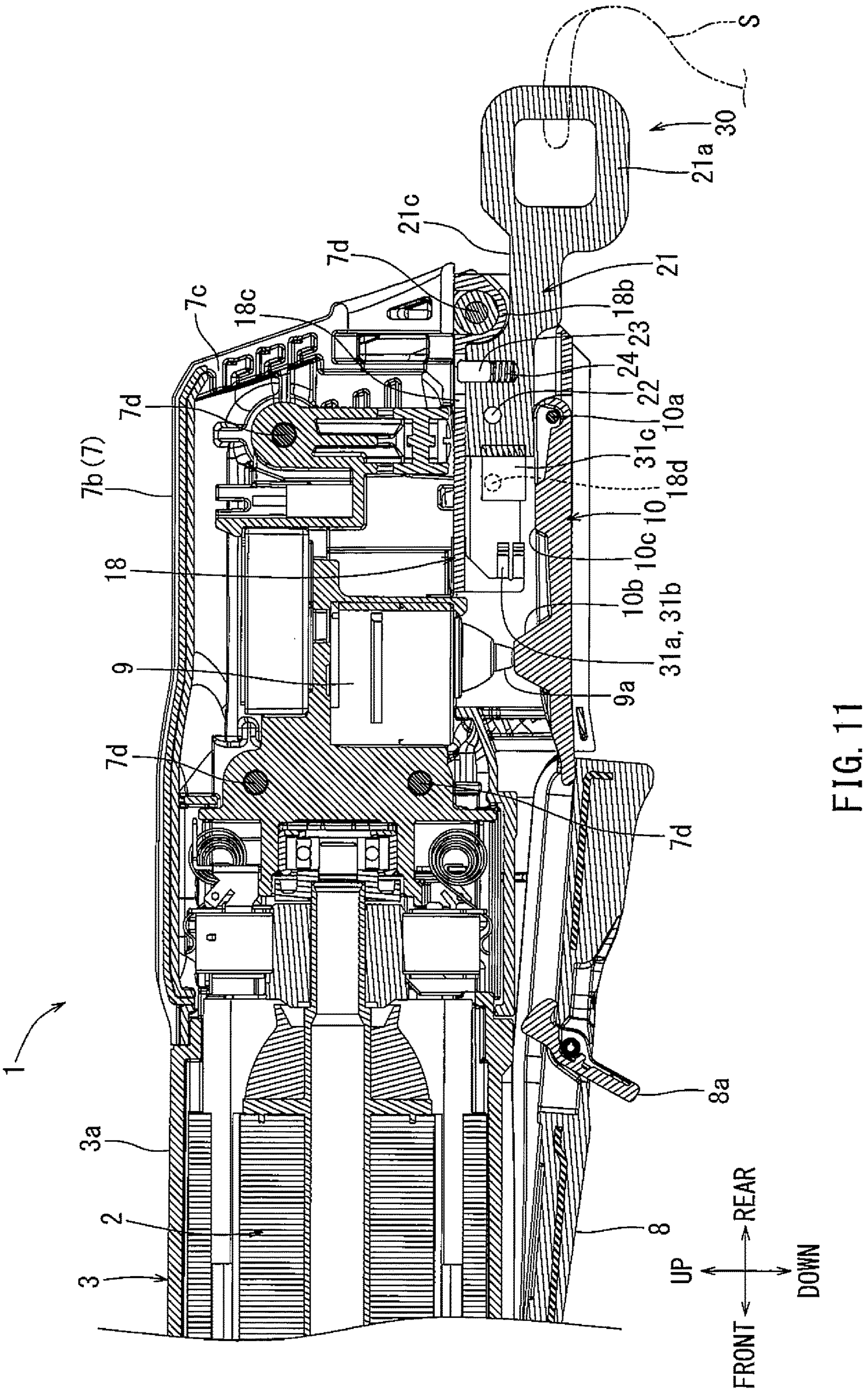
FIG. 11 is a longitudinal sectional view of the coupling part according to the third embodiment. This figure shows a state where the coupling member is located at the second position.
Figure 12:
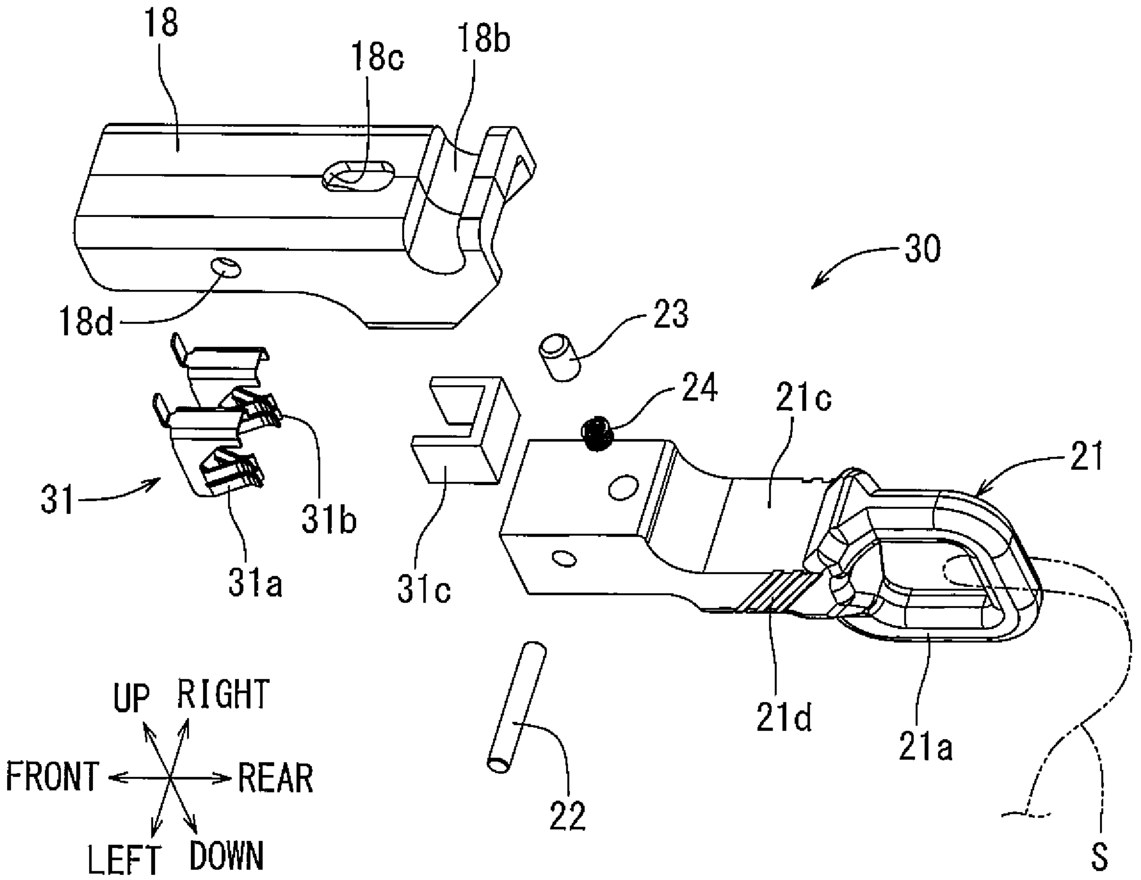
FIG. 12 is an exploded perspective view of the coupling part according to the third embodiment.

FIGS. 10 to 12 show a coupling part 30 according to a third embodiment. The coupling part 30 of the third embodiment is provided with a configuration in which a power circuit interruption function is added to the coupling part 20 of the second embodiment. Descriptions of members and configurations that do not need to be substantially changed will be omitted and the same signs will be used.

According to the third embodiment, a circuit conductive part 31 is installed between the frame body 18 and the coupling member 21. The circuit conductive part 31 is provided with contacts 31*a*, 31*b* attached to the frame body 18 and a conductive portion 31*c* attached to the coupling member 21. A conductive plate formed by bending a conductive steel plate strip into a U-shape is used for the conductive portion 31*c*. The contacts 31*a*, 31*b* are electrically incorporated into a power supply circuit. Each of the contacts 31*a*, 31*b* has a two-pronged structure, having elasticity in a direction in which the contacts are closed. Each of the ends of the conductive portion 31*c* are elastically inserted into the corresponding contacts 31*a*, 31*b*, so that they are held in a connection state. As shown in FIG. 10, in a normal state in which the coupling member 21 is located at the first position (a state in which a sufficient suspending function may be performed), both ends of the conducting portion 31*c* are inserted into the corresponding contacts 31*a*, 31*b*. As a result, the contacts 31*a*, 31*b* are electrically connected to each other via the conductive portion 31*c*. By electrically connecting the contacts 31*a*, 31*b*, the power supply circuit is brought into a conductive state. Therefore, when turning ON the switch lever 8 while in the conductive state, the electric motor 2 can be activated.

As shown in FIG. 11, if an impact is applied to the coupling member 21 via the suspension tool S, the shaft member 22 may disengage from the frame body 18 or the coupling member 21. As a result, the coupling member 21 is displaced to the second position. Thus, the conductive portion 31*c* disengages from the contacts 31*a*, 31*b*. Both ends of the conductive portion 31*c* are displaced rearward against the elastic pinching force of the contacts 31*a*, 31*b* (both ends of the conductive portion 31*c* are displaced in a direction in which the contact 31*a*, 31*b* are electrically open). Therefore, the conductive portion 31 disengage from the contact 31*a*, 31*b*. When the conductive portion 31*c* is disengaged from the contacts 31*a*, 31*b*, there is no conduction between the contacts 31*a*, 31*b*. Accordingly, the power supply circuit is cut off.

In the state where the coupling member 21 is displaced to the second position and the power circuit is cut off, the electric motor 2 cannot be activated, even if the switch lever 8 is pulled upward and the main switch 9 is turned on. According to the third embodiment, when the coupling member 21 is displaced to the second position, the power supply circuit is shut off. As a result, the electric motor 2 cannot be activated. Because of this configuration, the restriction protrusions 16*e*, 21*b* that restrict the displacement of the switch arm 10 to the ON position side described in the first and second embodiments are omitted. According to the first embodiment and the second embodiment, the restriction protrusions 16*e*, 21*b* contact the contact base 10*c*, so that the tilting operation of the switch arm 10 toward the ON side as well as the ON operation of the switch lever 8 are prohibited. As a result, the electric motor 2 is prevented from activation in the first and second embodiments. In contrast, although the tilting operation of the switch lever 8 is possible, the activation of the electric motor 2 is avoided by shutting off the power supply circuit in the third embodiment. As a result, the ON operation of the switch lever 8 is invalidated. In this respect, the third embodiment differs from the first and second embodiments.

According to the coupling part 30 of the third embodiment described above, if a large impact is applied to the coupling member 21 via the suspension tool S, the coupling member 21 may be displaced to the second position. This informs the user that the coupling part 30 has been damaged. Furthermore, the indicator 21*d* exposed by the displacement of the coupling part 21 to the second position can be visually confirmed in a reliable manner. Furthermore, once the coupling member 21 has been displaced to the second position, the engaging shaft 23 enters the engaging hole 18*c*. Thus, the coupling part 21 is prohibited from returning to the first position. Because of this, the user is also reliably informed that the coupling part 30 has been damaged.

According to the third embodiment, the user is notified of the fact that the coupling part 30 has been damaged, due to the displacement of the coupling member 21. As a result, the user can stop using the hand-held tool 1 or perform maintenance work of the coupling part 30, so that a reliable suspend function of the coupling part 30 will be performed.

Furthermore, according to the third embodiment, when the coupling part 30 is damaged and the coupling member 21 is displaced to the second position, the power supply circuit is shut off. As a result, the electric motor 2 cannot be activated, so that a more reliable notification can be obtained.

FIGS. 13 to 21 show the hand-held tool 1 according to a fourth embodiment. Since the basic configuration of the hand-held tool 1 does not need to be changed, the explanation is omitted and the same signs will be used. According to the fourth embodiment, a coupling part 40 for connecting the suspension tool S, such as the tether strap, has a different configuration from the first to third embodiments. The basic configuration of the hand-held tool 1 is not changed. Descriptions of members and configurations that do not need to be substantially changed will be omitted by using the same signs.

According to the fourth embodiment, a coupling part 40 is arranged on an upper portion of the rear surface of the rear case 7 and above the power cord 11. FIGS. 14 to 19 show the details of the coupling part 40 of the fourth embodiment. The coupling part 40 of the fourth embodiment is provided with a coupling member 41 for coupling the suspension tool S, such as the tether strap, a first position retaining member 42 for holding the coupling member 41 at the first position, a second position retaining member for holding the coupling member 41 at the second position, and an engaging shaft 44 for restricting a retracted end of the coupling member 41.

The coupling member 41 has an oval annular shape that is long in the front-to-rear direction. The suspension tool S is coupled to the rear portion of the coupling member 41. The first position retaining member 42 is engaged with the front portion of the coupling member 41. The first position retaining member 42 is provided with a pair of left and right engaging arms 42*a*. Each of the left and right engaging arms 42*a* is bent into an L-shape to form a bent part 42*b*, such that the bent parts 42*b* overlaps each other. Both engaging arms 42*a* have elasticity in a direction in which the bent parts 42*b* approach each other. The engaging arms 42*a* are respectively attached to the left and right side surfaces of the pedestal part 43 in parallel with each other. The pedestal part 43 is fixed to the rear case 7 and eventually to the body part 3.

The pair of left and right engaging arms 42*a* are in a closed state, in which the rear bent parts 42*b* overlap each other owing to their elasticity, so that the coupling member 41 is held at the first position (with the bent part 42*b* being located on an inner peripheral of the coupling member 41). FIGS. 13, 14, 16, and 18 show a normal state in which the coupling member 41 is held at the first position. If a large impact is applied to the coupling member 41 via the suspension tool S, the front portion of the coupling member 41 presses the bent parts 42*b* of the left and right engaging arms 42*a*. An external force in a pushed-and-open direction (rearward direction) is applied to both of the bent parts 42*b* via the coupling member 41. This causes both engaging arms 42*a* to be displaced in a direction in which they are separated from each other, against their elastic forces. Eventually the overlapping state of the bent parts 42*b* enters an open state. Because the engaging arms 42*a* are pushed open, the coupling member 41 may be displaced from the first position to the second position.

Figure 13:
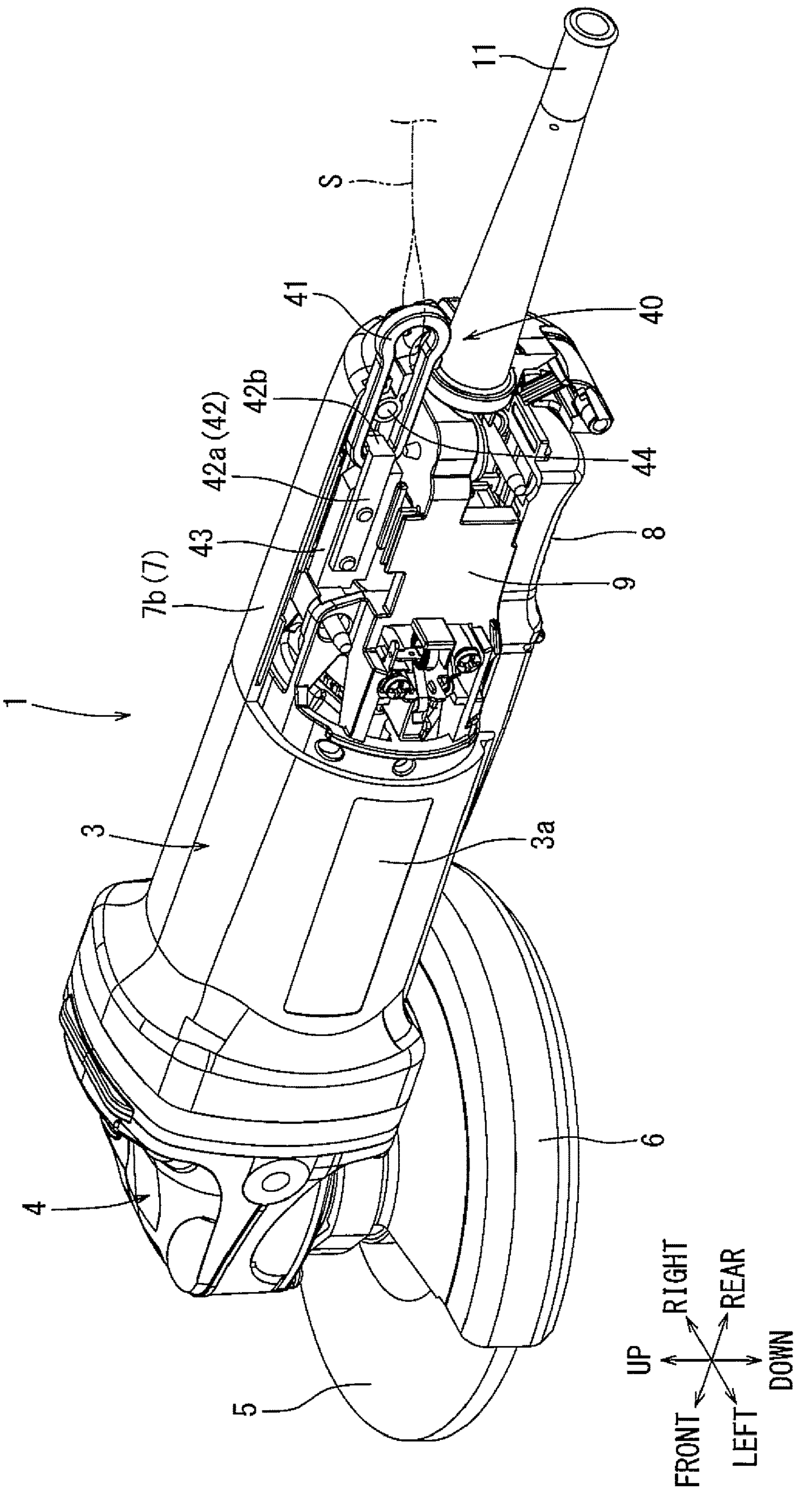
FIG. 13 is a perspective view of the hand-held tool provided with a coupling part according to a fourth embodiment. This figure shows a state where a left side rear case is removed and the coupling part is exposed. This figure shows a state where the coupling member is located at a first position.
Figure 14:
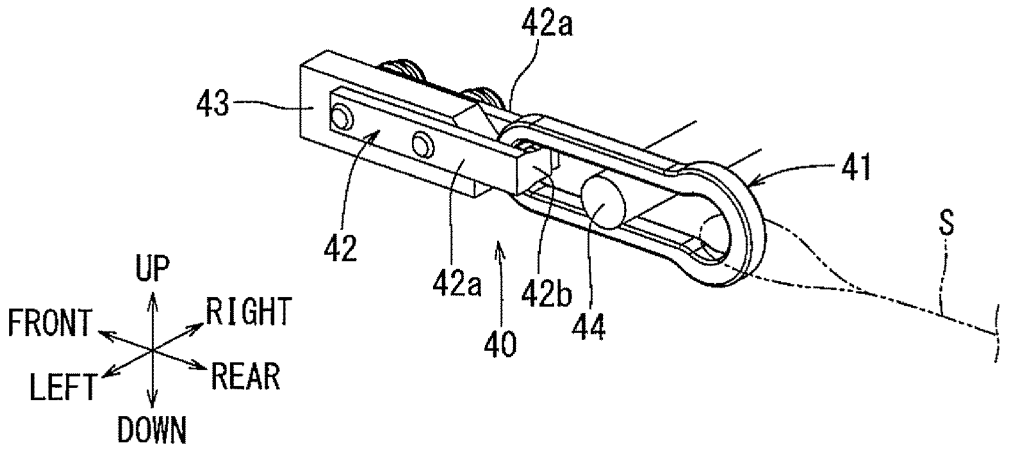
FIG. 14 is a perspective view of the coupling part according to the fourth embodiment. This figure shows a state where the coupling member is located at the first position.
Figure 15:
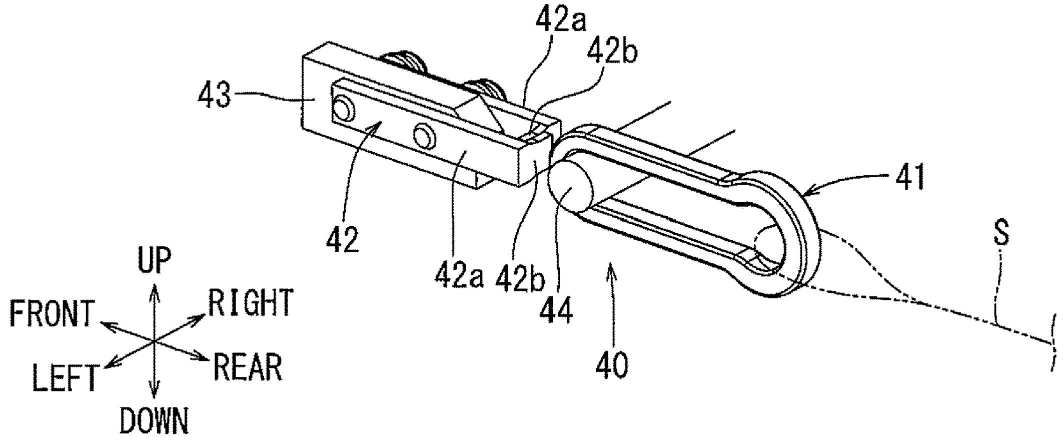
FIG. 15 is a perspective view of the coupling part according to the fourth embodiment. This figure shows a state where the coupling member is located at a second position.
Figure 16:
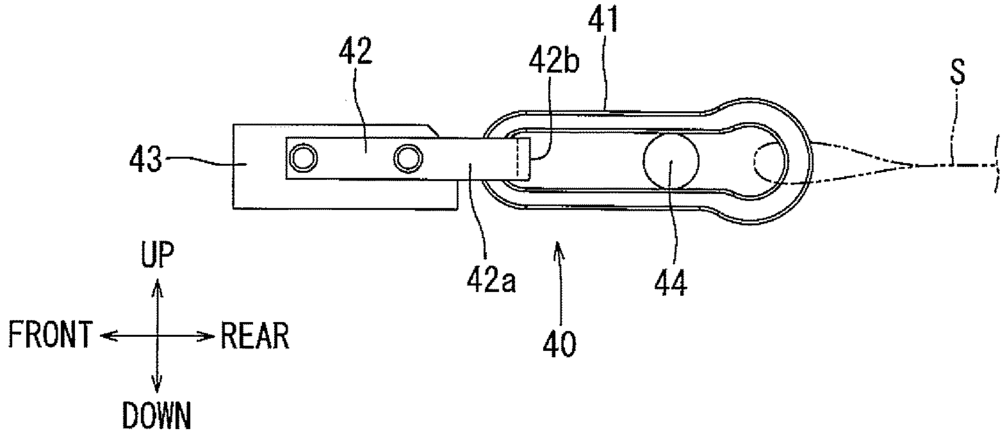
FIG. 16 is a side view of the coupling part according to the fourth embodiment. This figure shows a state where the coupling member is located at the first position.
Figure 17:
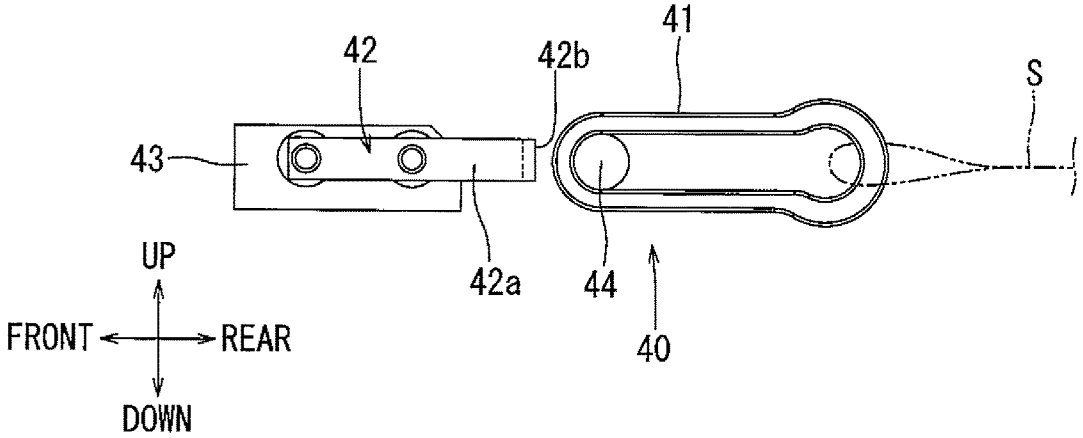
FIG. 17 is a side view of the coupling part according to the fourth embodiment. This figure shows a state where the coupling member is located at the second position.
Figure 18:
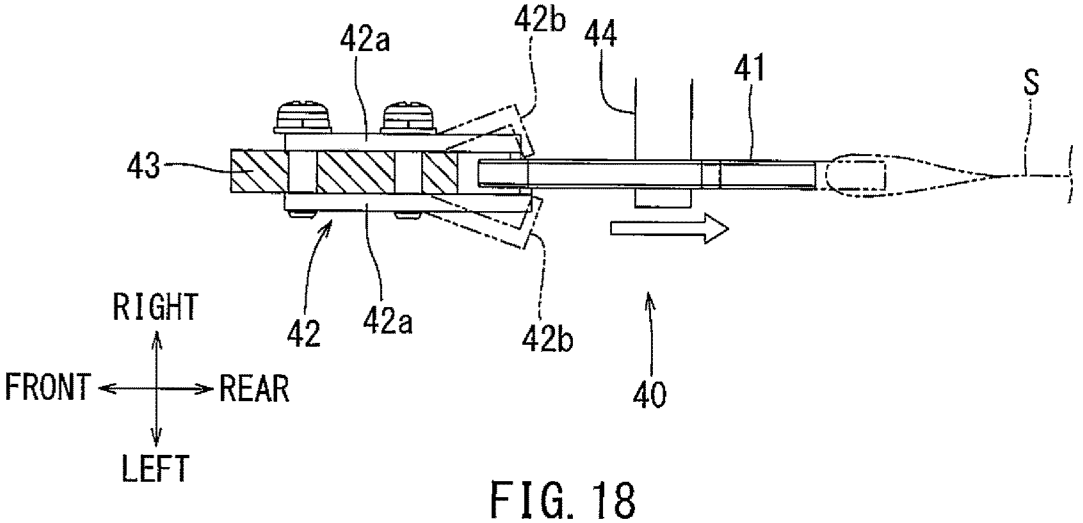
FIG. 18 is a plan sectional view of the coupling part according to the fourth embodiment. This figure shows a state where the coupling member is located at the first position. In this figure, an engaging arm in an open state is shown by a two-dot chain line.
Figure 19:
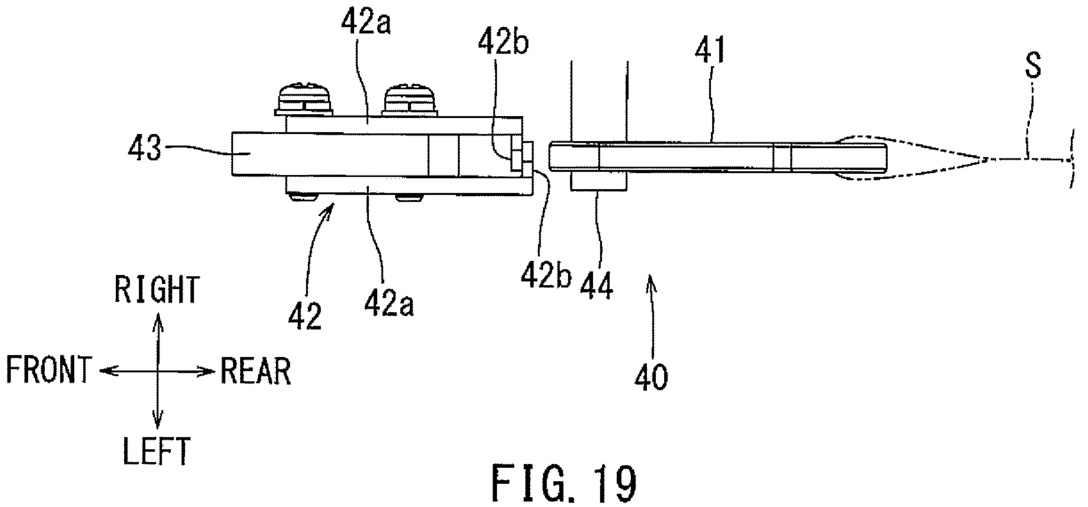
FIG. 19 is a plan view of the coupling part according to the fourth embodiment. This figure shows a state where the coupling member is located at the second position.
Figure 20:
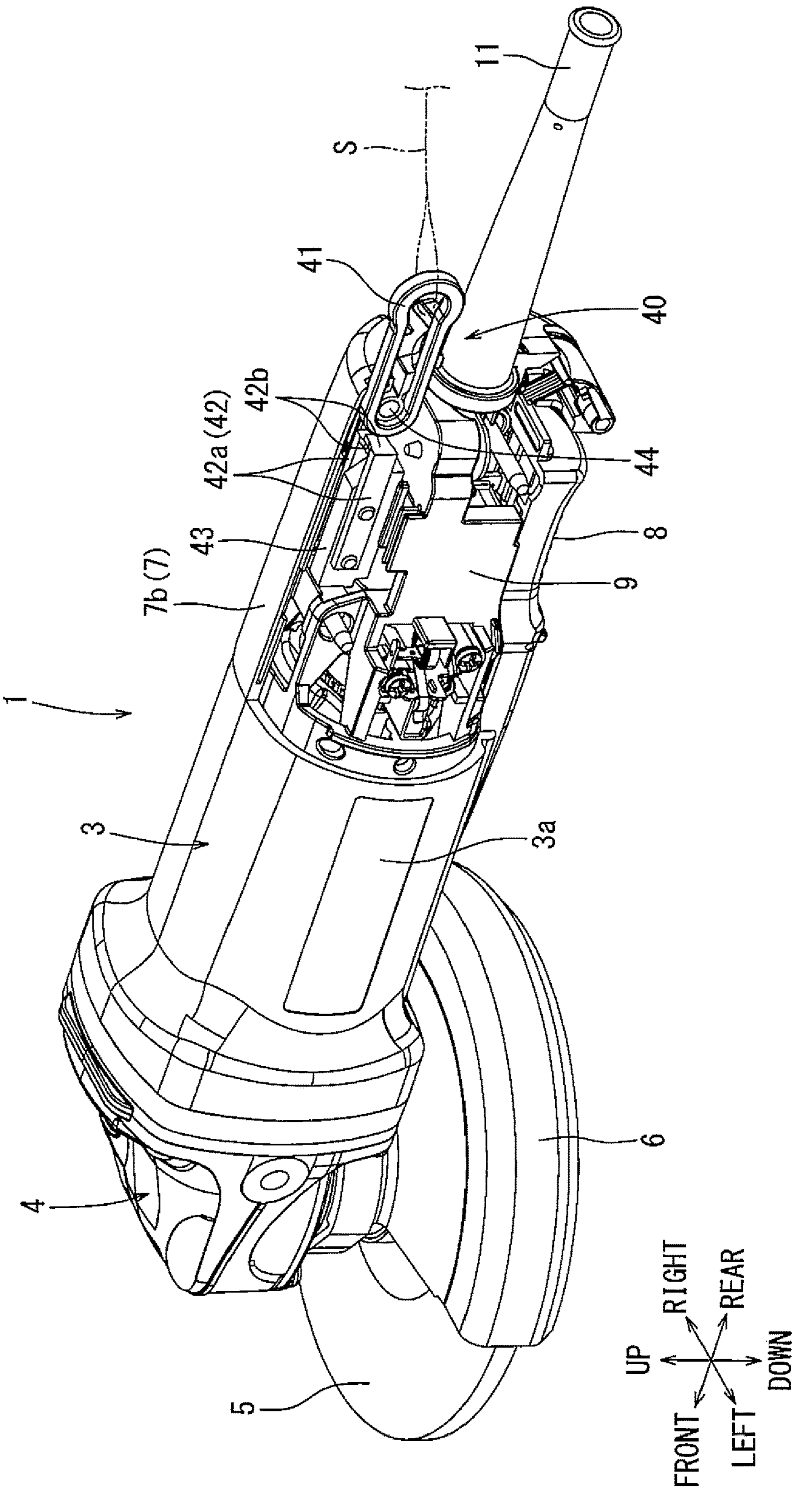
FIG. 20 is a perspective view of the hand-held tool provided with the coupling part according to the fourth embodiment. This figure shows a state where the left side rear case is removed and the coupling part is exposed. This figure shows a state where the coupling member is located at the second position.
Figure 21:
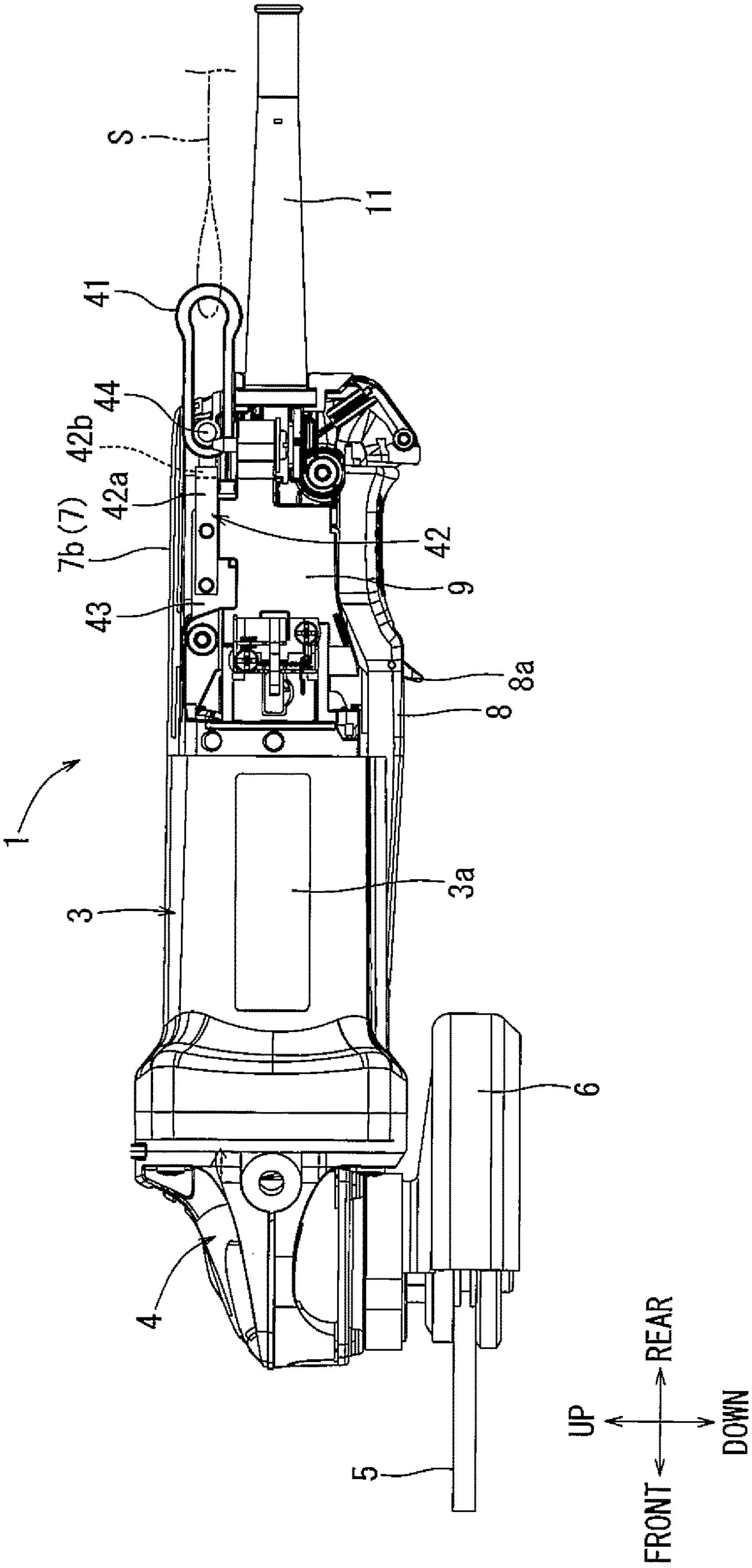
FIG. 21 is a side view of the hand-held tool provided with the coupling part according to the fourth embodiment. This figure shows a state where the left side rear case is removed and the coupling part is exposed. This figure shows a state where the coupling member is located at the second position.

As shown in FIG. 13, the engaging shaft 44, which partially serves as the second position retaining member, is located on the inner peripheral of the coupling member 41. The engaging shaft 44 is fixed to the rear case 7. Therefore, when the coupling member 41 is displaced rearward such that it displaces the pair of left and right engaging arms 42*a* in the opening direction against their elastic force, the coupling member 41 enters a state in which the retracting movement is further restricted by the engaging shaft 44. The retracted end position thus restricted by the engaging shaft 44 corresponds to the second position. FIGS. 15, 17, 19, 20, and 21 show the state where the coupling member 41 is displaced to the second position.

When the coupling member 41 is displaced from the first position to the second position, the pair of left and right engaging arms 42*a* move in a direction in which they approach each, other due to their elasticity. When each of the left and right engaging arms 42*a* is returned in its original position, the bent parts 42*b* are overlapped again and the closed state is reinstated. By closing the pair of left and right engaging arms 42*a*, the coupling member 41 displaced to the second position is prevented from being returned to the first position, and is therefore held at the second position. Because of this, the pair of left and right engaging arms 42*a*, especially the bent parts 42*b*, have a function of serving as the first position retaining member that hold the coupling member 41 at the first position as well as a function of partially serving as a second position retaining member that holds the coupling member 41 at the second position and prevents the coupling member 41 from returning to the first position.

The coupling member 41 is held in a state of being displaced at the second position by the pair of left and right engaging arms 42*a*, partially serving as the second position retaining member. Thereby, the user is notified that the coupling part 40 has been damaged, or the like. As a result, the necessity of maintenance work for the coupling part 40 is notified to the user. As described above, if the coupling member 41 is held at the second position by the pair of left and right engaging arms 42*a* being closed, the coupling member 41 becomes displaceable back and forth while making a rattling noise within a range where the coupling member 41 is not returned to the first position and where the coupling member 41 is not engaged with the engaging shaft 44. This notifies the user that the coupling part 40 has been damaged.

In the fourth embodiment, the coupling member 41 can be returned to the first position by removing the rear case 7 and opening the left and right engaging arms 42*a*. Because of this configuration, in the fourth embodiment, the coupling part 40 can be returned to the normal state without replacing parts, such as the engaging arm(s) 42*a*. In this respect, the fourth embodiment differs from the first to third embodiments.

According to the coupling part 40 of the fourth embodiment described above, the hand-held tool 1 is prevented from accidentally falling due to the suspension tool S when in a normal state where the coupling member 41 to which the suspension tool S is coupled is held at the first position. If a large impact is applied to the coupling part 40 via the suspension tool S when the hand-held tool 1 is prevented from falling, the coupling part 41 is displaced to the second position. As a result, the fact that the coupling part 40 has been damaged is visually notified to the user. Because of this, the user can recognize the necessity for maintenance work for the coupling part 40 by confirming that the coupling member 41 has been displaced to the second position. It can also be determined that subsequent use should be temporarily stopped.

With respect to the maintenance work for the coupling part 40, it is sufficient to open the left and right engaging arms 42*a* and to return the coupling member 41 back to the first position. Accordingly, it is not necessary to replace the parts, as described for the first to third embodiments. In the fourth embodiment, a pair of left and right engaging arms 42*a* is illustrated, but a configuration may be possible in which the coupling member 41 is held at the first position by only one engaging arm.

Further modifications may be made to the respective embodiments described above. Although the configuration is illustrated in which the coupling parts 15, 20, 30, and 40 for coupling the suspension tool S, such as a tether strap, are provided at the rear portion of the hand-held tool 1, they may instead be provided at the side portions or the front portion.

The features disclosed in the above-described first to fourth embodiments can be specified by a generic concept as follows. The features disclosed in the first to fourth embodiments relate to a hand-held tool that a user holds in his or her hand and that has a coupling part for coupling a suspension tool. The coupling part is provided with a coupling member displaceably supported with respect to the housing between a first position and a second position. A first position retaining member is structured for holding the coupling member at the first position. The coupling member is displaced to the second position by deforming the first position retaining member.

According to the above feature, the suspension tool, such as a tether strap, is coupled to the coupling member held at the first position by the first position retaining member. If an impact is applied to the coupling member via the suspension tool, the first position retaining member is deformed by the impact and the coupling member is displaced from the first position to the second position. The displacement of the coupling member to the second position visually informs the user that the coupling part has been damaged. By visually notifying the user that the coupling part has been damaged, the user can recognize that maintenance work, such as a replacement of the first position retaining member or the coupling member, is required. As a result, the suspension function of the suspension tool (and the function of the coupling part) can be reliably performed.

Another feature of the present disclosure is that the hand-held tool includes the second position retaining member for holding the coupling member at the second position.

According to the above feature, once the coupling member is damaged and the coupling member is displaced to the second position, the coupling member is held at the second position by the second position retaining member. Because of this, the fact that the coupling part has been damaged is reliably notified.

Another feature of the present disclosure is that the hand-held tool is configured such that the position holding function of the first position retaining member is lost after the coupling member is displaced to the second position. The coupling member can move freely between the first position and the second position.

According to the above feature, if the coupling part is damaged, the coupling member is in a freely movable state (a state of rattling vibration) between the first position and the second position. As a result, one is notified that the coupling part has been damaged.

Another feature of the present disclosure is that the hand-held tool is configured such that a spring may be used as the first position retaining member.

According to the above feature, the coupling member is held at the first position by the spring. If an impact is applied to the coupling member, for example via the suspension tool, the tension spring serving as the first position retaining member extends beyond an elastic region and is plastically deformed. Thereby, the coupling member is displaced to the second position. Due to the plastic deformation of the spring serving as the first position retaining member, one is notified that the coupling member is held at the second position and the coupling part has been damaged.

Another feature of the present disclosure is that the hand-held tool is configured such that a shaft member may be used as the first position retaining member.

According to the above features, the coupling member is held at the first position by the shaft member. When an impact is applied to the coupling member via the suspension tool, the shaft member serving as the first position retaining member is disengaged due to, for example, a breakage of the shaft member. Thereby, the coupling member is displaced to the second position. Since the shaft member serving as the first position retaining member is disengaged and is not returned to the original position, the coupling member is held at the second position. Because of this, one is notified that the coupling part has been damaged.

Another feature of the present disclosure is that the hand-held tool is configured such that the first position retaining member also has a function of prohibiting the coupling member displaced to the second position from returning to the first position.

According to the above features, if an impact is applied to the coupling member via the suspension tool, the coupling member is displaced to the second position. The plastically deformed first position retaining member prohibits the coupling member from returning to the first position. As a result, one is notified that the coupling part has been damaged. The first position retaining member has both the function of prohibiting the displacement of the coupling member from the first position to the second position as well as the function of prohibiting the coupling member from returning from the second position to the first position. Because of this, compactness of the coupling member and simplification of the configuration thereof can be obtained.

Another feature of the present disclosure is that the hand-held tool is configured such that the activation of the main body is prohibited when the coupling member is displaced to the second position.

According to the above feature, if the coupling part is damaged by the impact applied via the suspending tool, the suspending function may not be fully performed if the damaged coupling part is used. At this time, the coupling member has been displaced to the second position, and the user is notified that the coupling part has been damaged. Furthermore, since the main body becomes inoperable, one is more reliably notified that the joint has been damaged. Accordingly, use of the hand-held tool in a state where the coupling part has been damaged can be prevented.

Figure 22:
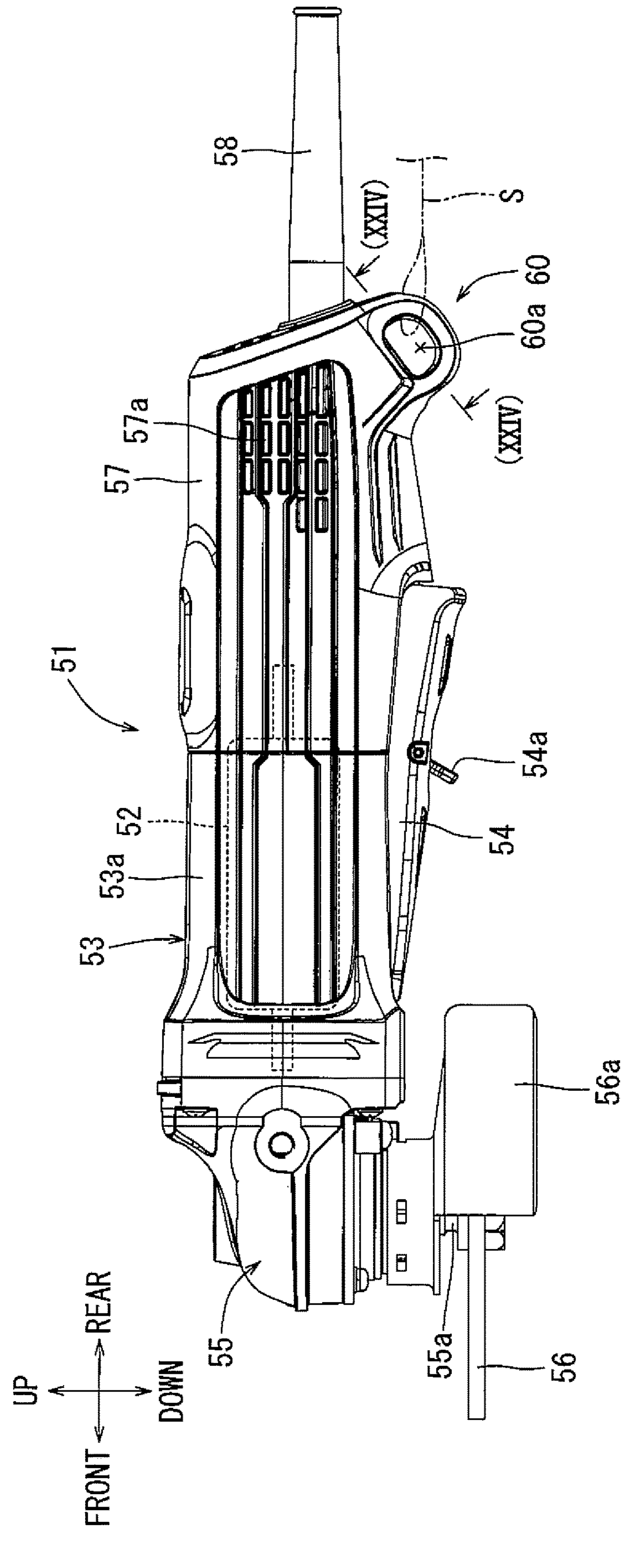
FIG. 22 is an overall side view of a hand-held tool according to a fifth embodiment.
Figure 23:
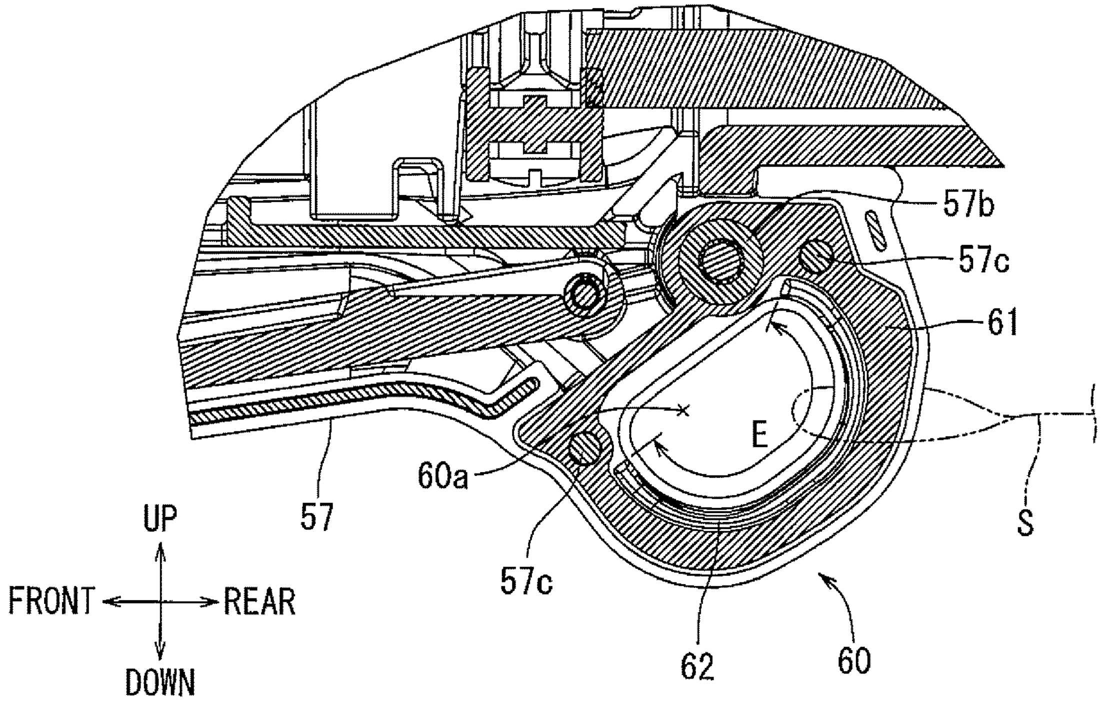
FIG. 23 is a longitudinal sectional view of the coupling part according to the fifth embodiment.
Figure 24:
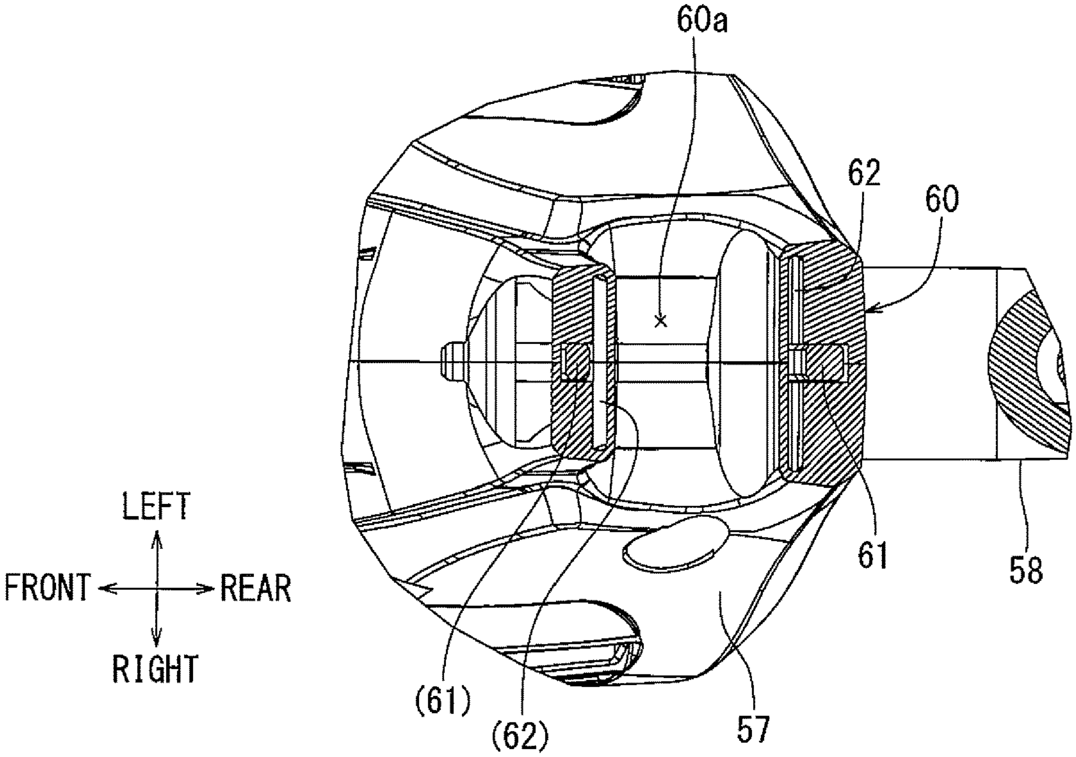
FIG. 24 is a figure viewed along arrows (XXIV)-(XXIV) in FIG. 22 and shows a cross sectional view of the coupling part according to the fifth embodiment.

FIGS. 22-24 show a coupling part 60 of a fifth embodiment. In the fifth embodiment, a disk grinder is illustrated as the hand-held tool 51, in the same way as in the first embodiment. The hand-held tool 51 is provided with a main body 53, in which an electric motor 52 serving as a drive source is housed in a tubular main body housing 53*a*. The main body housing 53*a* has a size configured to be easily held by one of a user's hand and configured to function as the grip.

A large switch lever 54 is provided on a lower surface of the main body 53, so as to be tilted in an up-to-down direction. When the switch lever 54 is pulled upward with the fingertip of the user's hand holding the main body 53, the electric motor 52 is activated. The switch lever 54 is provided with a small lock-off lever 54*a*. As illustrated, when the lock-off lever 54*a* is raised, the switch lever 54 cannot be pulled upward. Accordingly, the electric motor 52 remains in a stopped state (lock-off state). The lock-off lever 54*a* may be tilted rearward to release the lock-off state, so that the switch lever 8 can be pulled upward.

A gear head 55 is connected to a front side of the main body part 53. The gear head 55 includes a gear train (not shown in the figure) for decelerating an output of the electric motor 52 that is then output to a spindle 55*a*. The spindle 55*a* is orthogonal to a motor axis of the electric motor 52. The spindle 55*a* protrudes downward from the lower surface of the gear head 55. A circular grindstone 56 is attached to a lower portion of the spindle 55*a*. A rear side of the grindstone 56 is covered with a cover 56*a*.

A rear side of the main body 53 is covered with a rear case 57, the rear case 57 having a left and right half structure. A main switch, which is configured to be turned on and off by operating the switch lever 54, is provided inside the rear case 57, formed by mating the left half-split case with the right half-split case. A large number of intake ports 57*a* for introducing outside air are provided on the rear surface and the left and right side surfaces of the rear case 57. Although not shown in the figures, a cooling fan is attached to the output shaft of the electric motor 52. When the electric motor 52 is activated, the cooling fan rotates and then outside air is introduced into the rear case 57, as well as the main body housing 53*a*, via the intake port 57*a*. The introduced air (motor cooling air) mainly cools the electric motor 52. The motor cooling air is discharged to the outside from the vicinity of a connecting part between the main body 53 and the gear head 55.

In the present embodiment, a hand-held tool 51 driven by AC power is exemplified. A power supply cord 58 protrudes from the rear surface of the rear case 57. AC power is supplied via the power cord 58.

According to the fifth embodiment, the hand-held tool 51 is provided with a coupling part 60 for connecting a suspension tool S, such as a tether strap, for preventing the hand-held tool 51 from falling during work. The coupling part 60 of the fifth embodiment is provided at the rear part of the rear case 57 and below the power cord 58. The coupling part 60 is provided integrally with the rear case 57, which may both be made of resin, and has the left and right half-split structure, in the same manner as the rear case 57. The suspension tool S, such as a tether strap, can be coupled to the coupling part 60, which is made of resin and has a left and right half-split structure.

The coupling part 60 of the fifth embodiment has an annular shape. The suspension tool S is coupled to the inner peripheral hole 60*a* of the coupling part 60. As shown in the FIG. 23, a reinforcing plate 61 made of metal is provided inside the coupling part 60. The reinforcing plate 61 also has an annular shape. The reinforcing plate 61 is immovably fixed by the screw-fastening boss 57*b* of the rear case 57 and the two engaging protrusions 57*c*. The reinforcing plate 61 is provided along the entire circumference of the coupling part 60.

A cavity 62, an area in which the reinforcing plate 61 does not exist, is provided on the inner peripheral side of the coupling part 60 (on the side of the inner peripheral hole 60*a*) and on the inner peripheral side of the reinforcing plate 61. The cavity 62 is provided over the range of substantially half of the circumference along the lower portion side of the inner peripheral hole 60*a*. As shown in FIG. 24, the cavity 62 may have a wide flat plate shape corresponding to the width of the coupling part 60 in the left-to-right direction. As shown in FIG. 23, the area in which the cavity 62 is provided is indicated by the reference sign E. The inner periphery of the coupling part 60 is thinned by the cavity 62, such that a strength against an impact (impact resistance) is lower than that of other portions. The cavity 62 is not provided within the upper portion of the inner peripheral hole 60*a* of the coupling part 60. Instead, only a gap is formed by the left and right half-split structure is present at the upper portion of the inner peripheral hole 60*a*. Because of this, the impact resistance of the upper portion of the inner peripheral hole 60*a* of the coupling part 60 is higher than that of the lower portion thereof.

The suspension tool S is coupled to the coupling part 60 in a state in which it is wound around both the reinforcing plate 61 and the cavity 62. Because of this configuration, if the hand-held tool 51, for example, falls and an impact is applied to the coupling part 60, for instance via the suspension tool S, the impact may act on the cavity 62 having the lowest impact resistance. As a result, the cavity 62 may be damaged due to the impact. As a result, a crack may be generated. The user can visually confirm the damage, such as the generated crack, on the inner peripheral of the coupling part 60. Thereby, the user may be notified of the fact that the coupling part 60 has been damaged. Accordingly, the cavity 62 may function as a notification means for visually notifying the user that the coupling part 60 has been damaged.

According to the coupling part 60 of the fifth embodiment configured as described above, if the impact is applied to the coupling part 60 via the suspension tool S, the inner peripheral hole 60*a*, whose impact resistance is reduced due to the cavity 62, is damaged (deformed), for instance by cracks being generated. By visually confirming the damage, such as a crack, the user is informed that the coupling part 60 has been damaged to the extent that it cannot be properly used the way it is. By visually notifying the user that the coupling part 60 has been damaged, the user recognizes that maintenance work, such as repairs of the coupling part needs to be performed. As a result of the maintenance, the suspension function of the suspension tool S (function of the coupling part) can again be reliably performed.

Figure 25:
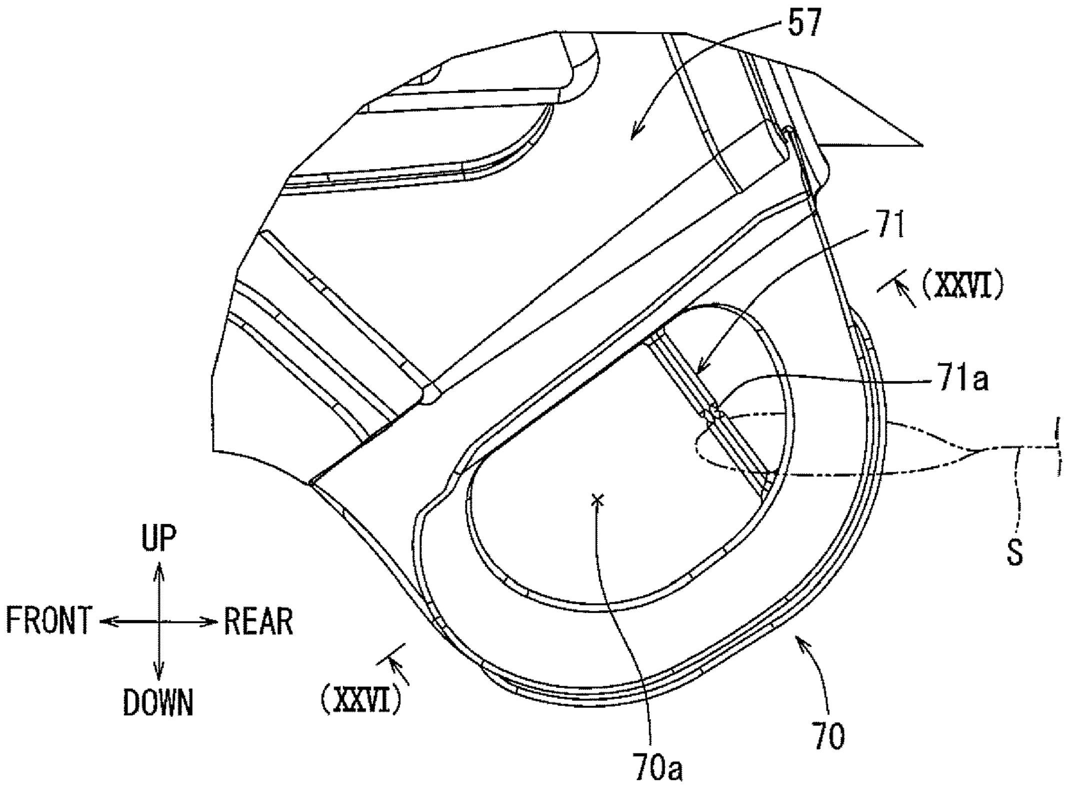
FIG. 25 is a side view of the coupling part according to a sixth embodiment.
Figure 26:
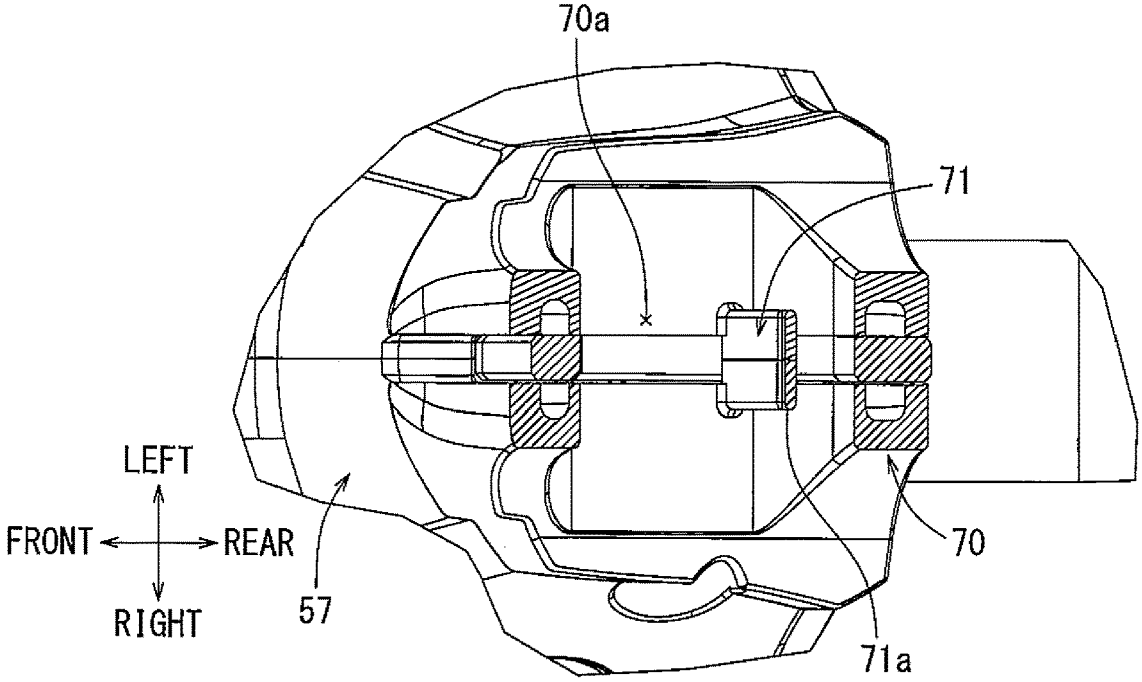
FIG. 26 is a figure viewed along arrows (XXVI)-(XXVI) in FIG. 25 and shows a cross sectional view of the coupling part according to the sixth embodiment.

FIGS. 25 and 26 show a coupling part 70 of a sixth embodiment. Similar to the fifth embodiment, a coupling part 70 according to the sixth embodiment is provided at the rear of the rear case 57 and below the power cord 58. The coupling part 70 has an annular shape. Furthermore, the coupling part 70 is provided integrally with the rear case 57, both made of resin, and the coupling part 70 has the left and right half-split structure. Members and configurations that do not need to be changed are denoted by the same reference numerals, and the description thereof will be omitted.

The suspension tool S is coupled to the inner peripheral hole 70*a* of the coupling part 70 of the sixth embodiment. In the sixth embodiment, a rib 71 is provided, so as to extend across the inner peripheral hole 70*a* of the coupling part 70. The rib 71 is configured as a portion having a low impact resistance. The rib 71 extends obliquely rearward from the upper portion of the inner peripheral hole 70*a* and reaches the lower rear portion of the inner peripheral hole 70*a*. The rib 71 has a flat plate shape, mostly with a constant width. Both ends of the rib 71 are firmly joined to the inner peripheral surface of the coupling part 70. The rib 71 is provided with a bent part 71*a* having a reduced plate thickness. The bent part 71*a* is provided at one location substantially at the center, in its longitudinal direction, of the rib 71.

If an impact is applied to the rib 71 in the plate thickness direction, the rib 71 may be broken at the bent part 71*a*. Because of this configuration, in the sixth embodiment, the rib 71 functions as a portion having a lower durability against the impact applied via the suspension tool S. The rib 71 may be a portion having a low impact resistance without the bent part 71*a*, for instance by thinning the rib 71 over its whole length.

According to the coupling part 70 of the sixth embodiment illustrated above, since the rib 71 is provided as the portion having low impact resistance, the user can visually confirm deformation of the rib 71. Thus, the user can recognize the fact that the coupling part 70 has been damaged.

Figure 27:
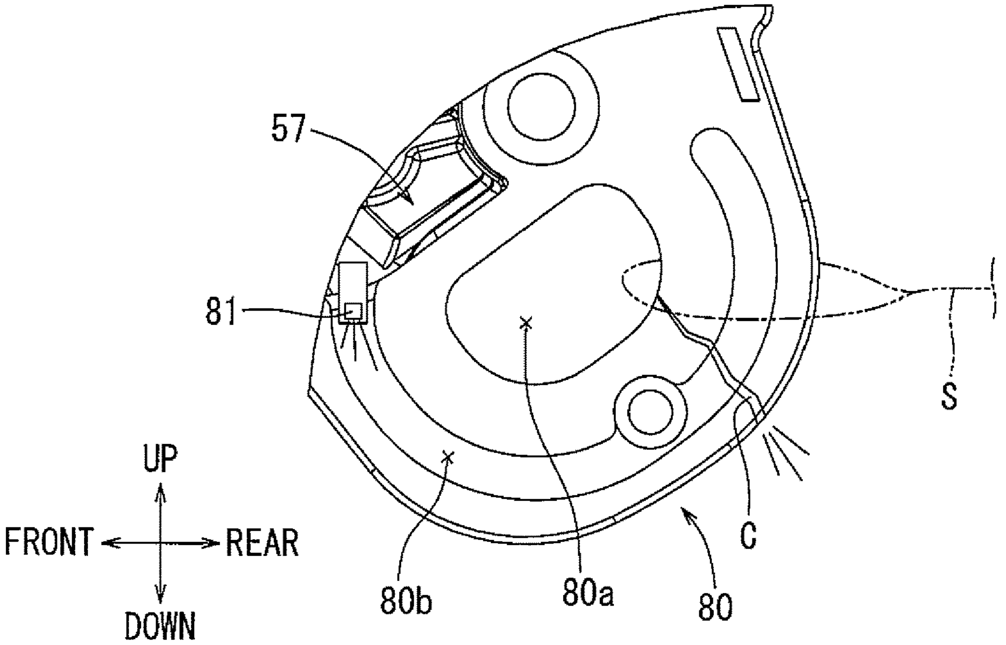
FIG. 27 is a longitudinal sectional view of the coupling part according to a seventh embodiment.
Figure 28:
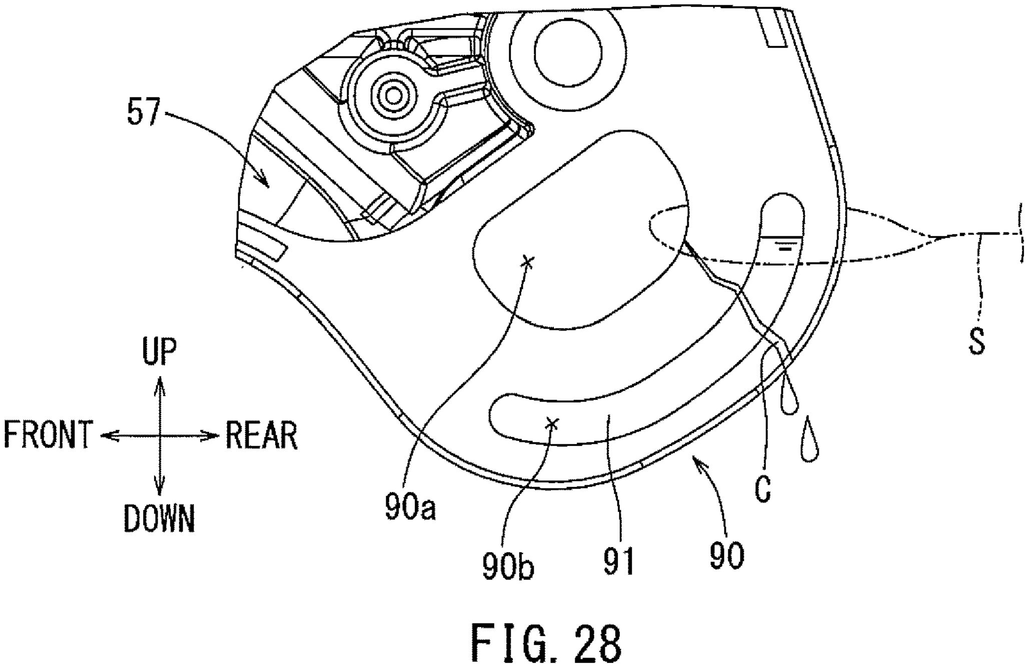
FIG. 28 is a longitudinal sectional view of the coupling part according to an eighth embodiment.

FIG. 27 shows a coupling part 80 of a seventh embodiment, and FIG. 28 shows a coupling part 90 of an eighth embodiment. The coupling part 80 of the seventh embodiment and the coupling part 90 of the eighth embodiment are also provided at the rear of the rear case 57 and below the power cord 58 respectively. The coupling parts 80, 90 of the seventh and eighth embodiments also have an annular shape. The coupling parts 80, 90 are provided integrally with the rear case 57, both of which are made of resin, and these coupling parts 80, 90 have a left and right half-split structure. The suspension tool S is coupled to the respective inner peripheral hole 80*a*, 90*a* of the corresponding coupling part 80, 90.

An empty space 80*b*, which may have an arc shape, is provided inside the coupling part 80 of the seventh embodiment. A light-emitting part 81 having a light emitting diode (LED) as a light source is provided at one end of the empty space 80*b*. The light of the light-emitting part 81 illuminates the entire empty space 80*b*. The light-emitting part 81 is lighted when the hand-held tool 51 is activated.

If an impact is applied to the coupling part 80 via the suspension tool S so as to cause a crack C to be generated in the coupling part 80, the light of the light-emitting part 81 leaks out from the crack C. The user can visually confirm the light leaked out from the crack C, and accordingly recognize that the coupling part 80 has been damaged.

An empty space 90*b*, which may have an arc shape, is provided inside the coupling part 90 of the eighth embodiment. Different from the empty space 80*b* according to the seventh embodiment, the empty space 90*b* according to the eight embodiment is sealed from the outside, for instance due to the left and right half-split structure of the coupling part 90. In the eighth embodiment, fluorescent paint 91 is filled in the empty space 90*b*. The fluorescent paint 91 is filled when the hand-held tool 51 is assembled.

If an impact is applied to the joint part 90 via the suspension tool S so as to cause a crack C to be generated in the joint part 90, the fluorescent paint 91 leaks out from the crack C. The user can recognize that the joint part 90 has been damaged by visually confirming the fluorescent paint 91 leaking out from the crack C.

According to the seventh and eighth embodiments, the fact that the light or fluorescent paint leaking out from the crack C visually informs the user that the joint parts 80, 90 have been damaged, the user can recognize the necessity of maintenance work for the joint parts 80, 90. Furthermore, the user can avoid using the hand-held tool 1 until the maintenance work has been completed. The maintenance of the coupling parts 80, 90 according to the seventh and eighth embodiments can be performed by, for example, replacing the rear case 57 with a new one.

Further modifications may be made to the embodiments described above. For example, in the fifth embodiment, a configuration is illustrated in which the cavity 62 is provided in the area indicated by “E” along the periphery of the inner peripheral hole 60*a*. However, it may be possible to provide a configuration in which the cavity 62 is provided over the entire circumference or in a narrower area than the area “E.”

Furthermore, the sixth embodiment illustrates a configuration in which one rib 71 is provided. However, it may be possible to provide a plurality of ribs in the inner circumferential hole 70*a* and each of the plurality of ribs may be provided with a bent part.

Furthermore, the above described coupling parts 60 to 90 are illustrated as being formed integrally with the rear case 57. However, it may be possible to provide a configuration in which the joints are manufactured as separate parts in advance and screw-fastened to the rear case. By making the coupling parts 60 to 90 separate from the rear case 57, the hand-held tool can be continuously used by replacing only the damaged coupling part with a new one during maintenance. As a result, it may be possible to reduce a maintenance cost and also to perform speedy maintenance work.

Furthermore, it may be possible to provide the coupling part for coupling the suspension tool S not only at the rear part of the rear case 57, but also at other parts, such as the upper part or the side part of the rear case 57, or the upper part or the side part of the main body 53. Also, the respective notification means exemplified in the present disclosure may be provided in these coupling parts.

Furthermore, a disc grinder is illustrated as the hand-held tool 1 and 51 in the first to eighth embodiments. However, the illustrated coupling parts may be used for drilling tools, such as a hammer drill and other electric tools, or power tools, such as a cutting machine. Moreover, an AC powered hand-held tool 1 is illustrated. However, the illustrated coupling parts may be applied to a rechargeable hand-held tool whose power source is a battery pack that can be repeatedly used by charging.

The features disclosed in the above-described fifth to eighth embodiments can be specified by a generic concept as follows. The features disclosed in the fifth to eighth embodiments relate to a hand-held tool that a user holds in his or her hand and that has a coupling part for coupling a suspension tool to the hand-held tool, as well as an informing means for visually recognizing deformation of the coupling part.

According to the above features, the suspension tool, such as a tether strap, is coupled to the coupling member, so as to prevent the hand-held tools from falling. If an impact is applied to the coupling part via the suspension tool, this fact is notified to the user by the notification means. Accordingly, the user can visually recognize this fact. By visually notifying the user that the coupling part has been damaged, the user can recognize that maintenance work, such as replacement of the coupling member, is required. As a result, the suspension function of the suspension tool (function of the coupling part) can be reliably performed.

Another features of the present disclosure relate to the hand-held tool configured such that the coupling part is provided with a high impact resistance part and a low impact resistance part. The low impact resistance part is configured to be deformed, so as to be used as a notification means.

According to the above features, if an impact is applied to the coupling part via the suspension tool, a stress concentrates on a part having low impact resistance, so as to cause the part to be easily damaged and deformed. Because the part having low impact resistance is damaged and deformed, the user is notified that the coupling part has been damaged. By purposely providing a part having low impact resistance and defining the part that can be damaged by the impact, it is possible to more reliably notify the user of the damage.

Another feature of the present disclosure relates to a hand-held tool that is provided with a cavity inside the coupling part as a part having low impact resistance.

According to the above feature, if an impact is applied to the coupling part via the suspension tool, the user is notified. For instance, the user is notified possible damage to the coupling part by the cavity serving as the part having low impact resistance being damaged due to the deformation.

Another feature of the present disclosure relates to a hand-held tool that is provided with a rib extending across the inner peripheral of a loop-shaped coupling part, the rib serving as a part having low impact resistance.

According to the above feature, if an impact is applied to the coupling part via the suspension tool, the user is notified of possible damage to the coupling by the rib serving as a part having low impact resistance being damaged due to the deformation.

Another feature relates to a hand-held tool that is provided with a notification means inside the coupling part.

According to the above feature, if an impact is applied to the coupling part via the suspension tool, the user is notified of this fact by the notification means provided inside the coupling part. The user can visually recognize the fact that the coupling part has been damaged by visually confirming the notification means. As a result, maintenance work for the coupling part may be promoted, and the suspending function of the suspension tool can be reliably exhibited.

Another feature of the present disclosure relates to a hand-held tool that is provided with a notification means inside the coupling part.

According to the above feature, if the coupling part is damaged by an impact applied via the suspension tool, light leaks out from the damaged part. This may notify one of the fact that the coupling part has been damaged.

Another feature of the present disclosure relates to a hand-held tool filled with paint as a notification means.

According to the above feature, if the coupling part is damaged enough to cause a crack, etc. due to an impact applied via the suspension tool, the paint flows out from the damaged part. This may visually notify one of the fact that the coupling part has been damaged. The visibility of the paint can be further improved by using a fluorescent paint.

What is claimed is:

1. A hand-held tool that is held by a hand of a user to operate, comprising:
   - a main body housing a motor; and
   - a coupling part that couples to a suspension tool, wherein:
   - the coupling part includes a coupling member that is displaceably supported relative to the main body of the hand-held tool between a first position and a second position without separating from the main body, and a first position retaining member that holds the coupling member at the first position;
   - the coupling member is configured to translate along a longitudinal direction of the main body from the first position toward the second position; and
   - the coupling member is displaced to the second position due to plastic deformation of the first position retaining member, thereby preventing the motor from being activated and prohibiting the hand-held tool from being activated.

2. The hand-held tool according to claim 1, wherein a shut off of a power circuit causes the hand-held tool to be prohibited from activation.

3. The hand-held tool according to claim 1, wherein when the coupling member is displaced to the second position, a switch lever is prohibited from an ON operation, thereby prohibiting the hand-held tool from activation.

4. The hand-held tool according to claim 1, wherein the plastic deformation prohibits the coupling member from returning to the first position after the coupling member has been displaced to the second position.

5. The hand-held tool according to claim 1, wherein the first position retaining member holds the coupling member at the first position by biasing the coupling member to the first position.

6. A hand-held tool, comprising:
   - a main body housing a motor;
   - a coupling part comprising a coupling member displaceably supported relative to the main body between a first position and a second position without separating from the main body, the coupling part configured to couple to a suspension tool; and
   - a first position retaining member configured to bias the coupling member towards the first position;
   - wherein the coupling member is configured to translate along a longitudinal direction of the main body from the first position toward the second position;
   - wherein when the coupling member is in the second position, the first position retaining member is configured to prevent the coupling member from being displaced to the first position; and
   - wherein the translation of the coupling member from the first position to the second position and the coupling member being in the second position prevent the motor from being activated.

7. The hand-held tool according to claim 6, wherein the coupling member is positioned further from the motor in the second position than in the first position.

8. The hand-held tool according to claim 1, further comprising:
   - an informing means configured to visually notify the user that the coupling part has been deformed.

9. The hand-held tool according to claim 8, wherein the informing means is positioned in the coupling part.

* * * * *